(12) United States Patent
Ishibe

(10) Patent No.: US 6,535,317 B2
(45) Date of Patent: Mar. 18, 2003

(54) LIGHT-SCANNING OPTICAL SYSTEM AND IMAGE-FORMING APPARATUS USING IT

(75) Inventor: Yoshihiro Ishibe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 38 days.

(21) Appl. No.: 09/817,125

(22) Filed: Mar. 27, 2001

(65) Prior Publication Data

US 2002/0001119 A1 Jan. 3, 2002

(30) Foreign Application Priority Data

Mar. 29, 2000 (JP) ........................................ 2000-091074
Mar. 14, 2001 (JP) ........................................ 2001-072023

(51) Int. Cl.[7] ............................................. G02B 26/08
(52) U.S. Cl. ........................ 359/205; 359/204; 359/205; 359/206; 359/207; 359/208; 359/216; 347/241; 347/244; 347/258; 347/259
(58) Field of Search ................................ 359/201–219, 359/662; 250/234–236; 347/243–244, 258–261

(56) References Cited

U.S. PATENT DOCUMENTS 5,995,131 A * 11/1999 Fujibayashi et al. ........ 347/258
6,133,935 A   10/2000 Fujibayashi et al. ........ 347/258

FOREIGN PATENT DOCUMENTS

| EP | 0 730 182 A2 | 4/1996 |
| JP | 8-297256 | 11/1996 |
| JP | 10-232347 | 9/1998 |

* cited by examiner

*Primary Examiner*—James Phan
(74) *Attorney, Agent, or Firm*—Fitzpatrick, Cella, Harper & Scinto

(57) ABSTRACT

A light-scanning optical system and light-scanning apparatus are capable of presenting an image at high speed and with high quality so as to equalize spot sizes throughout an entire surface to be scanned and nullify curving of scanning line, and an image-forming apparatus is also capable. The light-scanning optical system has a first optical system 2 for converting a beam emitted from light source 1 into a nearly parallel beam, a second optical system 4 for focusing the converted beam into a linear beam along the main scanning direction on a deflection facet of a deflecting device 5, and a third optical system 9 for focusing the beam deflected by the deflecting device, on the surface to be scanned 8. In the light-scanning optical system, the third optical system has at least one lens, and the at least one lens is arranged so that in the main scanning section a symmetry axis of the lens in the main scanning direction is inclined relative to a normal to the surface to be scanned, so as to bring the end of the lens on the light source side away from the deflecting device.

24 Claims, 13 Drawing Sheets

LIGHT-SCANNING OPTICAL SYSTEM AND IMAGE-FORMING APPARATUS USING IT

BACKGROUND OF THE INVENTION

1. Field of the Invention

The present invention relates to a light-scanning optical system and light-scanning apparatus using it and, particularly, is suitably applicable to image-forming apparatus, for example, such as laser beam printers, digital copiers, etc. involving the electrophotographic process, constructed to reflectively deflect light emitted from light source means (a single light source or plural light sources) by a polygon mirror as an optical deflector and optically scan a region on a surface to be scanned, through an f-θ lens system having the f-θ characteristics to record image information thereon.

2. Related Background Art

In the light-scanning optical systems (light-scanning apparatus) such as the laser beam printers and the like heretofore, the light emitted as optically modulated according to an image signal from the light source means is periodically deflected by the optical deflector, for example, consisting of a rotary polygon mirror (polygon-mirror), and the deflected light is converged in a spot shape on a surface of a photosensitive recording medium (photosensitive drum) by the f-θ lens system having the f-θ characteristics, to optically scan the region on the surface of the recording medium to effect image recording thereon.

FIG. 19 is a schematic diagram to show the major part of a conventional light-scanning optical system. In the same figure a diverging beam emitted from light source means 91 is converted into a nearly parallel beam or into a converging beam by a collimator lens 92. an aperture stop 93 shapes the beam (light amount), and the thus shaped beam is incident to a cylindrical lens 94 having its refracting power only in the sub-scanning direction. The beam entering the cylindrical lens 94 emerges in an as-incident state in the main scanning section while being converged in the sub-scanning section, thereby being focused as a substantially linear image near a deflection facet 95a of the optical deflector 95 consisting of a rotary polygon mirror (polygon mirror).

Then the beam reflectively deflected by the deflection facet 95a of the optical deflector 95 is guided through the f-θ lens system 96 having the f-θ characteristics onto a surface of photosensitive drum as a surface to be scanned 97, and the optical deflector 95 is rotated in the direction of arrow A to optically scan the region on the photosensitive drum surface 97 in the direction of arrow B (the main scanning direction), thereby recording image information thereon.

In order to implement highly accurate recording of image information in the image-forming apparatus using the light-scanning optical system of this type, it is necessary to meet the following requirements: the curvature of field is well corrected across the entire surface to be scanned, so as to equalize spot sizes; and the system has such distortion (f-θ characteristics) as to establish the proportional relation between angles and image heights of the beam reflectively deflected by the optical deflector.

Meanwhile, there are demands for optical systems capable of scanning at high speed because of an increase in speed and definition of laser beam printers, digital copiers, and so on. Since there are limitations to the rotational speed of a motor, which is part of the scanning means, to the number of facets of the polygon mirror, which is part of the deflecting means, and so on, there are increasing desires, particularly, for multi-beam scanning optical systems capable of scanning the surface simultaneously with a plurality of beams emitted from a plurality of light-emitting regions (light sources).

In order to equalize the spot sizes throughout the entire surface to be scanned in such multi-beam scanning optical systems, the curvature of field needs to be well corrected for, while lateral magnifications in the sub-scanning direction need to be equalized throughout all the image heights. If the lateral magnifications in the sub-scanning direction differ depending upon image heights, spot sizes in the sub-scanning direction will vary depending upon image heights.

Unless the lateral magnifications in the sub-scanning direction are equalized throughout all the image heights, there will arise another problem that when the light-emitting regions are located off the optical axis in the sub-scanning direction as in the multi-beam scanning optical systems, scanning lines will be curved and the spacing between the lines in the sub-scanning direction will vary depending upon the image heights, thus causing degradation of image quality.

The various light-scanning optical systems for solving such problems have been proposed heretofore, for example, in Japanese Patent Application Laid-Open Nos. 8-297256, 10-232347, and so on.

The light-scanning optical system described in Japanese Patent Application Laid-Open No. 8-297256 is constructed in such structure that change in the F-number in the sub-scanning direction depending upon image heights of the beams incident to the surface to be scanned, is suppressed by continuously changing curvatures in the sub-scanning section of at least two lens surfaces of a lens constituting the f-θ lens system from on the axis toward off the axis in the effective part of the lens. The above application describes the example in which the beams incident to the f-θ lens system are converging beams and in which the change in the F-number in the sub-scanning direction is suppressed well.

The scanning optical system described in Japanese Patent Application Laid-Open No. 10-232347 is constructed in such structure that the two lenses constituting the f-θ lens system are provided with an optimum combination of respective refracting powers in the sub-scanning section. The application describes the example in which the beams incident to the f-θ lens system are converging beams and in which the spot sizes in the sub-scanning direction are equalized on the surface to be scanned.

An object of the present invention is to nullify occurrence of jitter and effectively correct an asymmetric component in the curve of scanning line occurring in use of relatively large polygon diameters and a total inclination component in the magnifications in the sub-scanning direction across the entire scanning area in a light-scanning optical system (or a multi-beam light-scanning optical system) or in light-scanning apparatus (or multi-beam light-scanning apparatus) wherein the beam incident to the f-θ lens system is a nearly parallel beam, and thereby provide a light-scanning optical system capable of providing an image at high speed and with high quality while equalizing the spot sizes throughout the entire surface to be scanned and nullifying the curve of scanning line, and also provide light-scanning apparatus using it.

SUMMARY OF THE INVENTION

A light-scanning optical system according to one aspect of the invention is a light-scanning optical system comprising a first optical system for converting a beam emitted from light source means into a nearly parallel beam, a second optical system for focusing the converted beam into a linear beam along a main scanning direction on a deflection facet of deflecting means, and a third optical system for focusing the nearly parallel beam deflected by the deflecting means, on a surface to be scanned, the light-scanning optical system being constructed so that an optical axis of an incidence optical system including the first optical system and the second optical system is inclined relative to a normal to the surface to be scanned, at least in the main scanning section, wherein the third optical system comprises at least one optical element and the at least one optical element is arranged so that in the main scanning section a symmetry axis in the main scanning direction of the optical element is inclined relative to the normal to the surface to be scanned, so as to bring an end of the optical element on the light source means away from the deflecting means.

In one aspect of the above light-scanning optical system, the optical element arranged as inclined is a lens.

In a further aspect of the above light-scanning optical system, the optical element arranged as inclined is a reflecting mirror.

In a further aspect of the above light-scanning optical system, the optical element arranged as inclined includes a diffraction optical element.

In a further aspect of the above light-scanning optical system, the third optical system comprises two lenses.

In a further aspect of the above light-scanning optical system, a lens disposed on the surface-to-be-scanned side out of the two lenses of the third optical system has a larger refracting power in a sub-scanning section than that of the lens disposed on the deflecting means side.

In a further aspect of the above light-scanning optical system, the lens arranged as inclined is a lens disposed on the surface-to-be-scanned side out of the two lenses of the third optical system.

In a further aspect of the above light-scanning optical system, an optical axis of one lens out of the two lenses of the third optical system is arranged to be shifted by a predetermined distance in the main scanning direction, relative to an optical axis of the other lens.

In a further aspect of the above light-scanning optical system, the two lenses of said third optical system are first and second toric lenses arranged in the order named from the deflecting means side, the first toric lens has at least one lens surface of an aspherical shape in the main scanning section and is formed having a meniscus shape of a positive refracting power with a concave surface facing the deflecting means near a symmetry axis in the main scanning direction of the lens, and the second toric lens has two lens surfaces of an aspherical shape in the main scanning section and is formed in a meniscus shape having a positive, weak refracting power or almost no refracting power with a convex surface facing the deflecting means near a symmetry axis in the main scanning direction of the lens.

In a further aspect of the above light-scanning optical system, the first and second toric lenses in the sub-scanning section both have a meniscus shape with a concave surface facing the deflecting means.

In a further aspect of the above light-scanning optical system, curvatures of the two lens surfaces of the second toric lens in the main scanning section continuously vary from near the symmetry axis in the main scanning direction of the lens toward peripheral portions of the lens and signs of the curvatures are inverted in an intermediate portion.

In a further aspect of the above light-scanning optical system, the retracting power of said second toric lens in the sub-scanning section continuously varies on a symmetric basis from near the symmetry axis in the main scanning direction of the lens toward peripheral portions of the lens.

In a further aspect of the above light-scanning optical system, the refracting power of said first toric lens in the sub-scanning section continuously varies on an asymmetric basis from near the symmetry axis in the main scanning direction of the lens toward peripheral portions of the lens.

In a further aspect of the above light-scanning optical system, the refracting power of said first toric lens in the sub-scanning section becomes continuously stronger from near the symmetry axis in the main scanning direction of the lens toward peripheral portions of the lens and the refracting power of said second toric lens in the sub-scanning section becomes continuously weaker from near the symmetry axis in the main scanning direction of the lens toward peripheral portions of the lens.

In a further aspect of the above light-scanning optical system, the optical system satisfies the following condition:

$$|\phi 1s/\phi 2s| \leq 0.1 \quad \text{(Eq. 1)},$$

where $\phi 1s$ is the refracting power of the first toric lens in the sub-scanning section near the symmetry axis in the main scanning direction and $\phi 2s$ is the refracting power of the second toric lens in the sub-scanning section near the symmetry axis in the main scanning direction.

In a further aspect of the above light-scanning optical system, the optical system satisfies the following condition:

$$|\phi 1m/\phi 2m| \geq 100 \quad \text{(Eq. 2)},$$

where $\phi 1m$ is the refracting power of said first tonic lens in the main scanning section near the symmetry axis in the main scanning direction and $\phi 2m$ is the refracting power of the second toric lens in the main scanning section near the symmetry axis in the main scanning direction.

In a further aspect of the above light-scanning optical system, the third optical system establishes a conjugate relation between the deflecting means and the surface to be scanned in the sub-scanning section and satisfies the following condition:

$$1.5 \leq \beta c \leq 4.0,$$

where $\beta c$ Is an image magnification in the sub-scanning section near the symmetry axis of the third optical system in the main scanning direction.

In a further aspect of the above light-scanning optical system, the third optical system establishes a conjugate relation between the deflecting means and the surface to be scanned in the sub-scanning section and satisfies the following condition:

$$0.9 \leq \beta/\beta c \leq 1.1 \quad \text{(Eq. 3)}.$$

where $\beta c$ is an image magnification in the sub-scanning section near the symmetry axis of the third optical system in the main scanning direction and $\beta$ is an image magnification in the sub-scanning section at an arbitrary position off the axis in the main scanning direction.

In a further aspect of the above light-scanning optical system, the first toric lens and the second toric lens comprise a plastic material.

In a further aspect of the above light-scanning optical system, the light source means comprises a plurality of light-emitting points.

An image-forming apparatus according to another aspect of the present invention is an image-forming apparatus comprising the light-scanning optical system according to either one of the above aspects, a photosensitive member placed on the surface to be scanned, a developing unit for developing an electrostatic latent image formed on the photosensitive member by the beam by way of the light-scanning optical system, into a toner image, a transfer unit for transferring the toner image thus developed, onto a transfer medium, and a fixing unit for fixing the toner image thus transferred, on the transfer medium.

Another image-forming apparatus according to still another aspect of the present invention is an image-forming apparatus comprising the light-scanning optical system according to either one of the above aspects, and a printer controller for converting code data supplied from an external device, into an image signal and for supplying the image signal to the light-scanning optical system.

DETAILED DESCRIPTION OF THE PREFERRED EMBODIMENTS

<Embodiment 1>

Figure 1A:
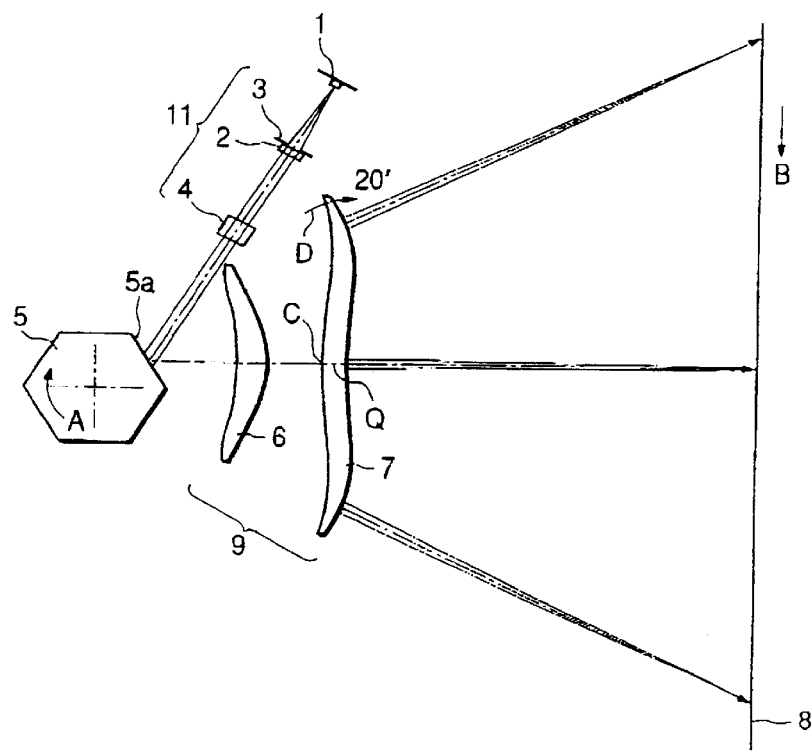
FIGS. 1A and 1B are cross-sectional views to show the major part in the main scanning direction and in the sub-scanning direction of Embodiment 1 of the present invention.
Figure 1B:
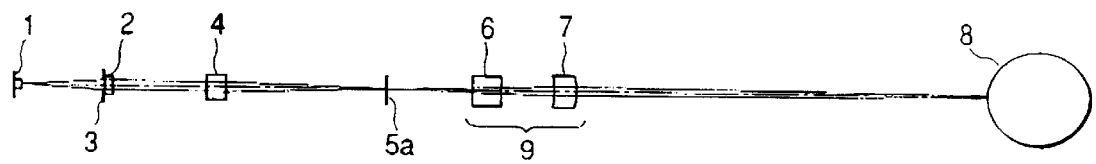

FIG. 1A is a cross-sectional view of major part in the main scanning direction (main scanning section) of Embodiment 1 of the light-scanning optical system (light-scanning apparatus) according to the present invention, and FIG. 1B is a cross-sectional view of major part in the sub-scanning direction (sub-scanning section) of FIG. 1A.

In the present specification the main scanning direction is defined as a direction into which a beam is reflectively deflected (deflected to scan) by the deflecting means, and the sub-scanning direction as a direction perpendicular to the optical axis of the scanning optical means and to the main scanning direction.

In the figures reference numeral 1 designates a light source means. which consists, for example, of a semiconductor laser or the like. Numeral 3 denotes an aperture stop, which limits a passing beam to shape the beam. Numeral 2 represents a collimator lens as a first optical system, which converts a diverging beam emitted from the light source means 1 into a nearly parallel beam. Numeral 4 indicates a cylindrical lens as a second optical system, which has a predetermined power only in the sub-scanning direction and which focuses the beam having passed through the collimator lens 2, into an almost linear image on a deflection facet (reflective face) 5a of optical deflector 5, described hereinafter, in the sub-scanning section. Each of the elements such as the aperture stop 3, the collimator lens 2, and the cylindrical lens 4 constitutes an element of an incidence optical system 11. Numeral 5 denotes an optical deflector as a deflecting means, which consists, for example, of a polygon mirror (rotary polygon mirror) of hexahedral structure and which is rotated at constant speed in the direction of arrow A in the figure by a driving means (not illustrated) such as a motor or the like.

Numeral 9 represents an f-θ lens system as a third optical system having the converging function and the f-θ characteristics. which consists of two plastic lenses of first and second toric lenses 6, 7, which focuses the beam based on image information, reflectively deflected by the optical deflector 5, on a photosensitive drum surface 8 as a surface to be scanned, and which has an inclination correcting function by establishing a conjugate relation between the deflection facet 5a of the optical deflector 5 and the photosensitive drum surface 8 in the sub-scanning section.

In the present invention, the optical axis of the incidence optical system including the first and second optical systems is so set as to be at least inclined with respect to the normal to the surface to be scanned in the main scanning section.

Numeral 8 represents a photosensitive drum surface (a surface of an image carrier) being a surface to be scanned.

In the present embodiment the semiconductor laser 1 emits the diverging beam, the aperture stop 3 limits the beam (light amount), the collimator lens 2 converts the beam into a nearly parallel beam, and the nearly parallel beam enters the cylindrical lens 4. The nearly parallel beam entering the cylindrical lens 4 emerges in an as incident state in the main scanning section. The beam entering the cylindrical lens 4 is converged in the sub-scanning section to be focused as an almost linear image (a linear image whose longitudinal direction is the main scanning direction) on a deflection facet 5a of the optical deflector 5. The beam reflectively deflected by the deflection facet 5a of the optical deflector 5 then travels through the first and second toric lenses 6, 7 to be focused in spot shape on the photosensitive drum surface 8. The optical deflector 5 is rotated in the direction of arrow A, whereby the beam optically scans the region on the photosensitive drum surface 8 at uniform velocity in the direction of arrow B (the main scanning direction). This implements recording of an image on the photosensitive drum surface 8 as a recording medium.

Next described in detail are the features of the first and second toric lenses 6, 7 constituting the third optical system 9 in the present embodiment.

The first toric lens 6 has two lens surfaces of aspherical shape in the main scanning section and is of meniscus shape having a positive refracting power with the concave surface facing to the optical deflector 5 near the symmetry axis Q in the main scanning direction of the lens.

The second toric lens 7 has two lens surfaces of aspherical shape in the main scanning section and is of meniscus shape having a positive, weak refracting power with the convex surface facing to the optical deflector 5 near the symmetry axis Q in the main scanning direction of the lens.

The first and second toric lenses 6, 7 both are constructed so that the shape in the sub-scanning section perpendicular to the main scanning section is the meniscus shape with the concave surface facing to the optical deflector 5.

Here the second toric lens 7 is arranged in the main scanning section so that the symmetry axis Q in the main scanning direction of the lens 7 is inclined relative to the normal to the surface to be scanned 8 so as to bring the end of the lens 7 on the light source means 1 side away from the optical deflector 5. Namely, the second toric lens 7 is inclined by 20' (20 minutes) in the direction of arrow D in the figure toward the surface to be scanned 8 about point C on the optical axis of the lens 7.

The reason why the second toric lens 7 is inclined in the main scanning section as described above will be described below.

Figure 2:
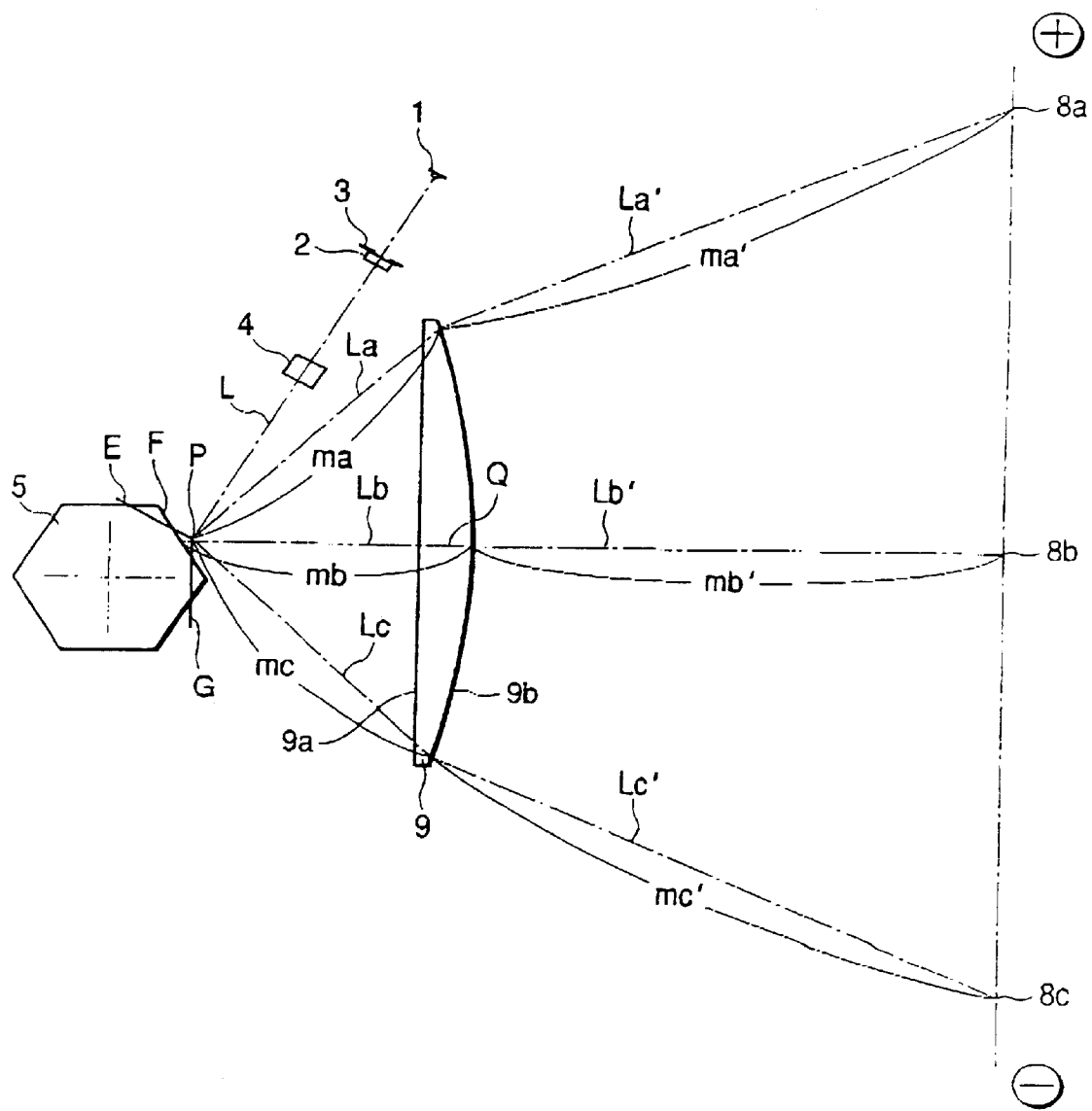
FIG. 2 is a diagram to show the positional relation of the beam entering the optical deflector, with the optical deflector and f-θ lens system.

FIG. 2 is a cross-sectional view of major part in the main scanning direction to show the positional relation of the optical deflector 5 and the positional relation of the f-θ lens system 9 with the principal ray L of the light incident to the optical deflector 5 in common scanning optical systems. In FIG. 2 the same elements as those illustrated in FIGS. 1A and 1B are denoted by the same reference symbols.

In FIG. 2 the beam L incident to the optical deflector 5 is reflectively deflected as a beam La, Lb, or Lc while the deflection facet 5a of the optical deflector 5 continuously changes its state as E, F, or G in the figure. Each beam La, Lb, or Lc enters the f-ϕ lens system 9 to be focused at each image point 8a, 8b, or 8c on the surface to be scanned 8.

When the deflection facet 5a of the optical deflector 5 is in the state of E, the beam drops on the end of the effective scanning region on the scanning start side (which is defined as the positive side). When the deflection facet 5a is in the state of F, the beam drops on the center of scanning. When the deflection facet 5a is in the state of G, the beam drops on the end of the effective scanning region on the scanning end side (which is defined as the negative side).

Normally, it is common practice to employ such a layout that the principal ray L of the beam entering the deflection facet 5a is made incident toward an intersecting point (point P in the figure) between the deflection facet 5a in the state of E and the deflection facet 5a in the state of G, in consideration of symmetry of correction for face inclination.

On the other hand, it is also common practice to employ such a layout that the optical axis Q in the is main scanning section of the f-θ lens system 9 is placed near the beam Lb reflectively deflected by the deflection facet 5a in the state of F, in consideration of symmetry of correction for curvature of field in the sub-scanning direction, Now let us consider a case in which a linear image is formed at point P in the figure by the cylindrical lens 4. The point P is present on the positive side with respect to the optical axis Q in the main scanning section of the f-θ lens system 9. For facilitating understanding, let us assume here that the power in the sub-scanning section of the f-θ lens system 9 exists on the second surface 9b of the f-θ lens system 9. In order to correct face inclination in the sub-scanning section, the f-θ lens system 9 establishes conjugate relations between the point P and the respective image points 8a, 8b, 8c in the figure. Let ma, mb, mc, ma', mb', and mc' be lengths of respective beams La, Lb, Lc, La', Lb', Lc'. Then lateral magnifications βa, βb, βc in the sub-scanning section corresponding to the respective image points 8a, 8b, 8c are expressed by the following equations, respectively.

βa=ma'/ma, βb=mb=/mb, βc=ma'/mc, where ma, mb, and mc are distances from the deflection facet to the exit surface of the f-θ lens system, and ma', mb', and mc' are distances from the exit surface of the f-θ lens system to the surface to be scanned.

Since the point P is present on the positive side with respect to the optical axis Q in the main scanning section of the f-θ lens system 9, the following relation holds, ma'/ma>mc'/mc.

Namely, βa>βc. When the common layout is employed as described previously, lateral magnifications in the sub-scanning section at image heights on the positive side in the figure become larger than those at image heights on the negative side in the figure, so that there occurs a difference between magnifications on the scanning start side and on the scanning end side.

The above difference between magnifications in the sub-scanning section leads to variation in the size of focused spot in the sub-scanning direction on the surface to be scanned 8 between on the scanning start side and on the scanning end side, thus becoming the cause of degradation of image quality.

On the other hand, in the case of the multi-beam light-scanning optical Systems using the multi-beam laser or the like having a plurality of light-emitting points as the light source, there occurs variation in the spacing between focused spots in the sub-scanning direction on the surface to be scanned 8 between on the scanning start side and on the scanning end side, also becoming the cause of degradation of image quality.

In the present embodiment, therefore, the second toric lens 7 is inclined by 20' (20 minutes) in the direction of arrow D in the figure and toward the surface to be scanned 8 about the point C on the optical axis of the lens 7 in the main scanning section as described above, whereby ma'/ma and mc'/mc described above can be made equal to each other, i.e., βa=βc. This perfectly corrects the difference between the magnifications in the sub-scanning section on the scanning start side and on the scanning end side.

Conventionally, the technique of inclining at least one lens forming the f-θ lens system as in the present embodiment was employed in the light-scanning optical systems wherein the beam incident to the f-θ lens system 9 was the converging beam (Japanese Patent Application Laid-Open No. 10-232347). When the beam entering the f-θ lens system is the converging beam, asymmetric residual aberration appears in the f-θ characteristics. Therefore, the lens is inclined in order to correct the residual aberration.

In the light-scanning optical systems wherein the beam entering the f-θ lens system 9 is the nearly parallel beam as in the present embodiment, the above asymmetric residual aberration of the f-θ characteristics cannot usually appear, and thus the inclined arrangement of the lens is not normally employed.

In the present embodiment, however, in order to correct the difference between magnifications in the sub-scanning section on the scanning start side and on the scanning end side, the second toric lens 7 is inclined in spite of the configuration wherein the beam entering the f-θ lens system 9 is the nearly parallel beam.

When the second toric lens 7 is arranged as inclined in this way, there arises a problem of degradation of the f-θ characteristics and the curvature of field in the main scanning direction.

In the present embodiment, therefore, the optical axis of the first toric lens 6 is shifted relative to the optical axis of the second toric lens 7 in the main scanning direction. Specifically, the optical axis of the second toric lens 7 is shifted by 0.3 mm to the positive side (to the light source side) in FIG. 2, relative to the optical axis of the first toric lens 6. This arrangement can well correct both the f-θ characteristics and the curvature of field in the main scanning direction.

When the second toric lens 7 is inclined as described above to correct the difference between magnifications in the sub-scanning section on the scanning start side and on the scanning end side, the refracting power in the sub-scanning section of the second toric lens 7 is preferably set larger than that of the first toric lens 6. The angle of inclination of the second toric lens 7 can be decreased by employing such setting of power layout, which can weaken the influence on the f-θ characteristics and on the curvature of field in the main scanning direction.

Preferably, it is desirable to set the refracting powers of the respective lenses in the sub-scanning section so as to satisfy the following condition:

$$|\phi 1s/\phi 2s| \leq 0.1 \qquad (1),$$

where $\phi 1s$ is the refracting power of the first toric lens 6 in the sub-scanning section near the symmetry axis in the main scanning direction and $\phi 2s$ the refracting power of the second toric lens 7 in the sub-scanning section near the symmetry axis in the main scanning direction.

Condition (1) concerns the power ratio in the sub-scanning section of the first and second toric lenses 6, 7. If the refracting powers of the first and second toric lenses 6, 7 in the sub-scanning section are set off the range of Condition (1), the angle of inclination will be too large for correcting the difference between magnifications in the sub-scanning section by the inclination of the second toric lens 7 and the influence thereof will become strong on the f-θ characteristics and on the curvature of field in the main scanning direction. Therefore, the ranges outside Condition (1) are not preferred.

The refracting power of the second toric lens 7 in the main scanning section is desirably a positive, weak refracting power or almost no refracting power.

Namely, when the second toric lens 7 is inclined as described above to correct the difference between magnifications in the sub-scanning section on the scanning start side and on the scanning end side, the influence from the inclined arrangement of the second toric lens 7 can be weakened on the f-θ characteristics and on the curvature of field in the main scanning direction by providing the second toric lens 7 with the weak refracting power or almost no refracting power in the main scanning section.

Preferably, it is desirable to set the refracting powers in the main scanning section of the lenses so as to satisfy the following condition:

$$|\phi 1m/\phi 2m| \geq 100 \qquad (2),$$

where $\phi 1m$ is the refracting power of the first toric lens 6 in the main scanning section near the symmetry axis in the main scanning direction and $\phi 2m$ the refracting power of the second toric lens 7 in the main scanning section near the symmetry axis in the main scanning direction.

Condition (2) concerns the power ratio in the main scanning section of the first and second toric lenses 6, 7. If the refracting powers of the respective lenses in the main scanning section are set off the range of Condition (2), the Influence will become stronger on the f-θ characteristics and on the curvature of field in the main scanning direction when the difference between magnifications in the sub-scanning section is intended to be corrected by the inclination of the toric lens.

The phrase "the weak refracting power of the second toric lens 7 in the main scanning section" means the following relation:

$$1000 > |\phi 1m/\phi 2m| \geq 100.$$

The phrase "almost no refracting power of the second toric lens 7 in the main scanning section" means the following relation:

$$|\phi 1m/\phi 2m| \geq 1000.$$

The second toric lens 7 is formed in such shape in the main scanning section that curvatures of its two lens surfaces continuously vary from near the symmetry axis in the main scanning direction of the lens 7 toward the peripheral portions of the lens and that signs of the curvatures are inverted in the intermediate region. By employing this shape, it becomes feasible to well correct, particularly, for the f-θ characteristics throughout the entire scanning area while keeping the distance small to the surface to be scanned 8.

Further, the refracting power of the first toric lens 6 in the sub-scanning section is set to become continuously stronger from near the symmetry axis in the main scanning direction of the lens 6 toward the peripheral portions of the lens, whereas the refracting power of the second toric lens 7 in the sub-scanning section is set conversely to become continuously weaker from near the symmetry axis in the main scanning direction of the lens 7 toward the peripheral portions of the lens.

By setting the refracting powers of the respective lenses 6, 7 in the sub-scanning section as described above, the lateral magnifications in the sub-scanning section are corrected so as to be constant throughout the entire scanning area.

The f-θ lens system 9 is set to satisfy the following condition:

$$1.5 \leq \beta c \geq 4.0 \qquad (3),$$

where βc is the image magnification in the sub-scanning section near the symmetry axis in the main scanning direction as described previously.

Condition (3) defines the image magnification in the sub-scanning section of the f-θ lens system 9. Below the lower limit of Condition (3), it becomes easier to correct the lateral magnifications in the sub-scanning section so as to be constant throughout the entire scanning area, but the f-θ lens system 9, particularly, the second toric lens 7 in the present embodiment, becomes closer to the surface to be scanned 8 to increase the size of the lens itself, thus degrading compactness and increasing cost. Therefore, the range below the lower limit is not preferred. Over the upper limit of Condition (3), the size of the f-θ lens system 9 can be decreased, but it becomes difficult to well correct the difference between magnifications in the sub-scanning section on the scanning start side and on the scanning end side. Therefore, the range above the upper limit is not preferred.

By employing the above configuration wherein the refracting power of the first toric lens 6 in the sub-scanning section is set to become continuously stronger from near the symmetry axis in the main scanning direction of the lens 6 toward the peripheral portions of the lens whereas the refracting power of the second toric lens 7 in the sub-scanning section is set conversely to become continuously weaker from near the symmetry axis in the main scanning direction of the lens 7 toward the peripheral portions of the lens, the lateral magnifications in the sub-scanning section are corrected to be constant throughout the entire scanning area so as to satisfy the following condition:

$$0.9 \leq \beta/\beta c \leq 1.1 \quad (4),$$

where βc is the image magnification in the sub-scanning section near the symmetry axis in the main scanning direction and β the image magnification in the sub-scanning section at an arbitrary position except near the symmetry axis in the main scanning direction. The symmetry axis corresponds to a locus of the principal ray of the beam to be perpendicularly incident on the surface to be scanned 8 passing through the lens.

Condition (4) concerns the ratio of the image magnifications in the sub-scanning section near the symmetry axis and at an arbitrary position except near the symmetry axis in the main scanning direction. If the ratio is below the lower limit or above the upper limit of Condition (4), there will occur variation in the size of the focused spot in the sub-scanning direction on the surface to be scanned 8 between on the scanning start side and on the scanning end side, becoming the cause of degradation of image quality.

In the case of the multi-beam light-scanning optical systems using the multi-beam laser or the like having the plurality of light-emitting points as the light source, there will appear variation in the spacing between focused spots in the sub-scanning direction on the surface to be scanned 8 between on the scanning start side and on the scanning end side, also becoming the cause of degradation of image quality.

The refracting power of the first toric lens 6 in the sub-scanning section is continuously varied on an asymmetric basis from near the symmetry axis in the main scanning direction of the lens 6 toward the peripheral portions of the lens. By setting the refracting power in the sub-scanning section in this way, the asymmetric component of the curvature of field in the sub-scanning direction is corrected well.

The refracting power of the second toric lens 7 in the sub-scanning section is continuously varied on a symmetric basis from near the symmetry axis in the main scanning direction of the lens 7 toward the peripheral portions of the lens.

In the present embodiment the first and second toric lenses 6, 7 are made by injection molding of a plastic material, thereby reducing the cost.

Table 1 exhibits various characteristics of the single-beam light-scanning optical system in the present embodiment.

The shapes of the aspherical surfaces in the main scanning section of the first and second toric lenses 6, 7 are expressed by the equation below in the coordinate system wherein the origin is set at an intersecting point between each lens surface and the optical axis, the X-axis is taken along the direction of the optical axis, the Y-axis along an axis perpendicular to the optical axis in the main scanning section, and the Z-axis along an axis perpendicular to the optical axis in the sub-scanning section.

$$X = (y^2/R)/[1+\{1-(1+k)(y/R)^2\}^{1/2}] + B_4 y^4 + B_6 y^6 + B_8 y^8 + B_{10} y^{10}$$

In the above equation, R represents the radius of curvature, and k, and $B_4$ to $B_{10}$ are aspherical coefficients.

The shapes of the first and second toric lenses 6, 7 in the sub-scanning section are such that the radius r' of curvature at the lens surface coordinate of Y in the main scanning direction is expressed by the following equation.

$$r' = r(1 + D_2 y^2 + D_4 y^4 + D_6 y^6 + D_8 y^8 + D_{10} y^{10})$$

In the equation, r represents the radius of curvature on the optical axis, and $D_2$ to $D_{10}$ coefficients.

If a coefficient on the positive side is different from that on the negative side in FIG. 2, the coefficient on the positive side is accompanied by suffix u. while the coefficient on the negative side by suffix 1.

Figure 3:
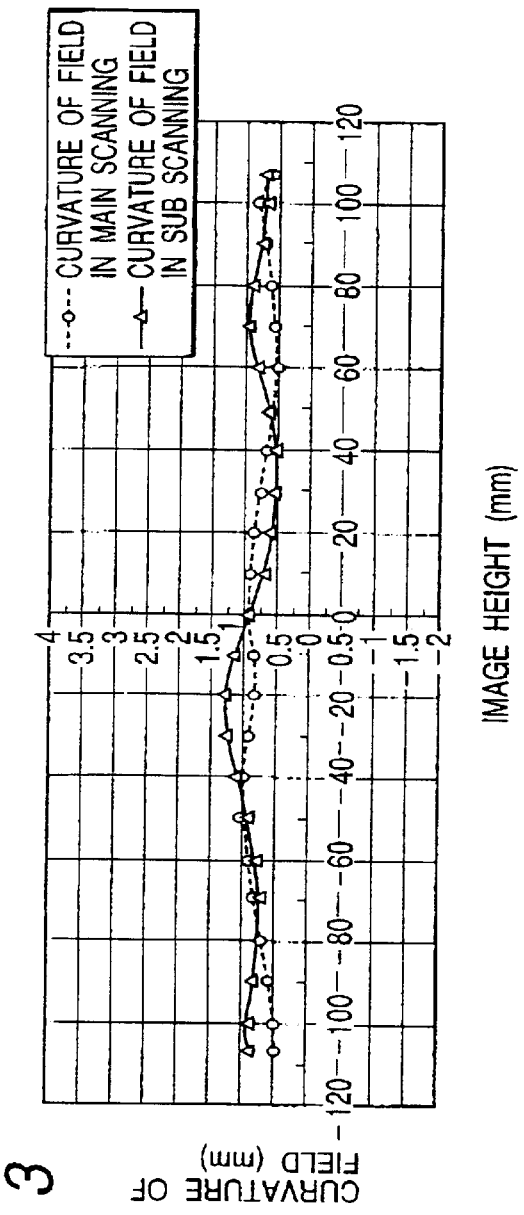
FIG. 3 is an aberration diagram to show the curvature of field in the main scanning direction and in the sub-scanning direction of Embodiment 1 of the present invention.
Figure 4:
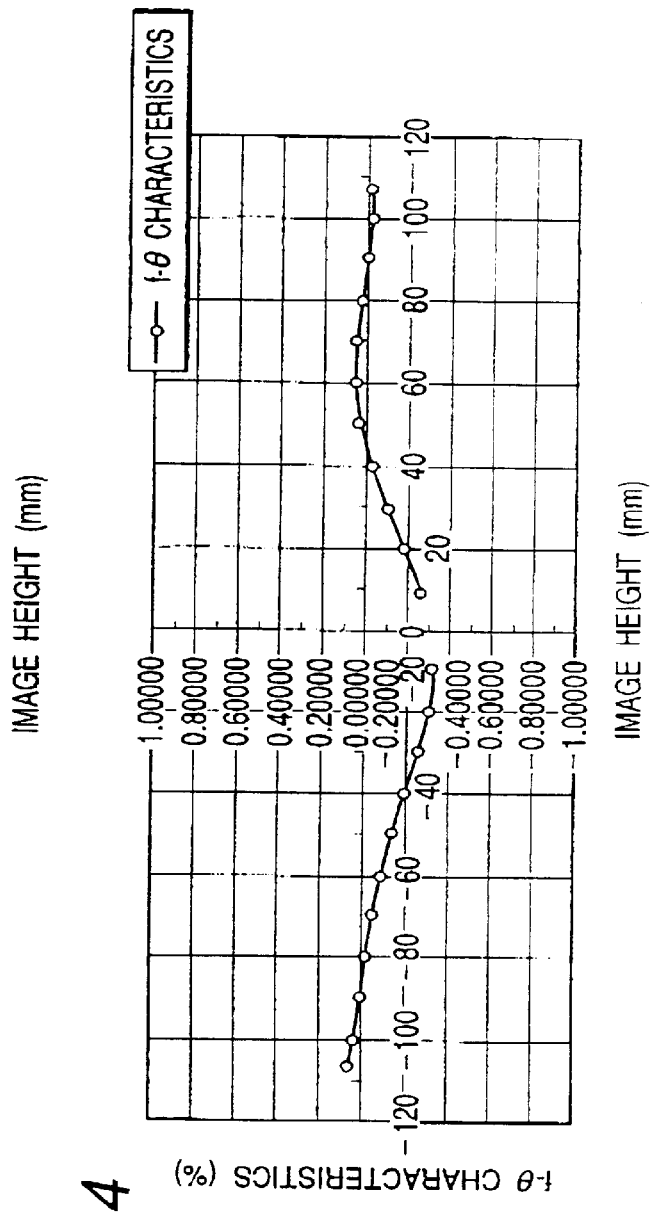
FIG. 4 is an aberration diagram to show the f-θ characteristics of Embodiment 1 of the present invention.
Figure 5:
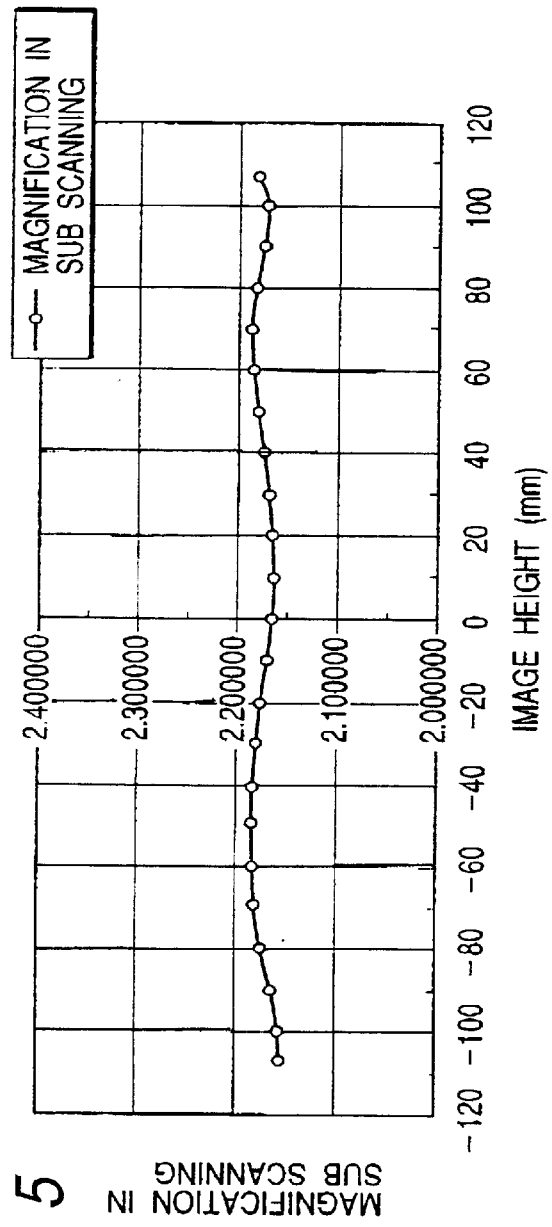
FIG. 5 is a diagram to show magnifications in the sub-scanning section of Embodiment 1 of the present invention.
Figure 6:
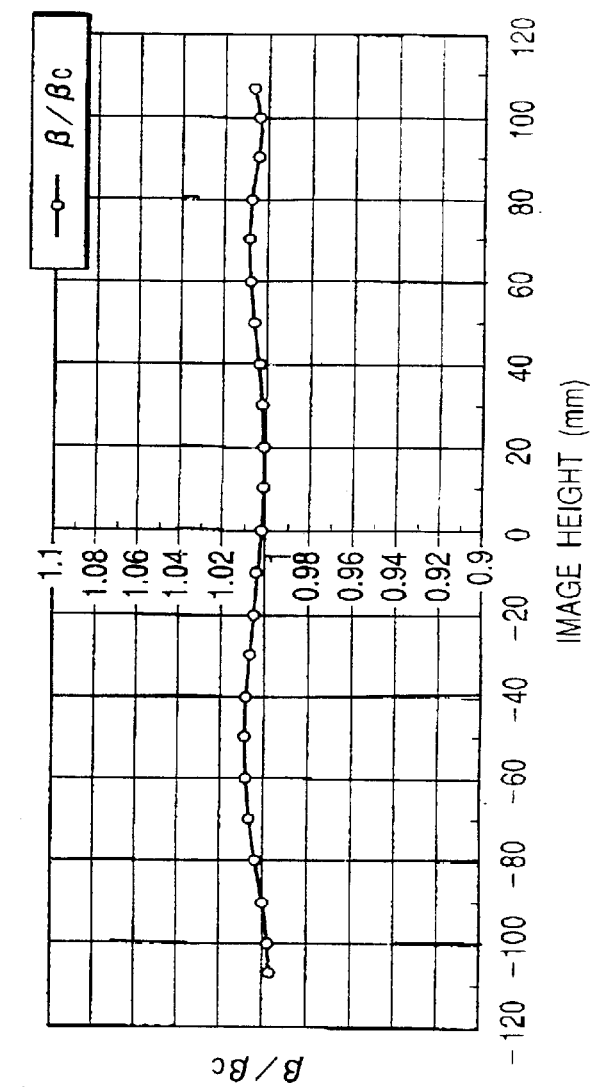
FIG. 6 is a diagram to show β/βc of Embodiment 1 of the present invention.

FIG. 3 is an aberration diagram to show the curvature of field in the main scanning direction and in the sub-scanning direction in the present embodiment, FIG. 4 an aberration diagram to show the f-θ characteristics of the present embodiment, FIG. 5 an explanatory diagram to show the lateral magnifications in the sub-scanning section across the entire scanning area, and FIG. 6 an explanatory diagram to show the relation of β/βc. It is apparent from each of the figures that each of the aberrations is corrected well to a level in which there arises no problem in practical use.

<Embodiment 2>

Figure 7A:
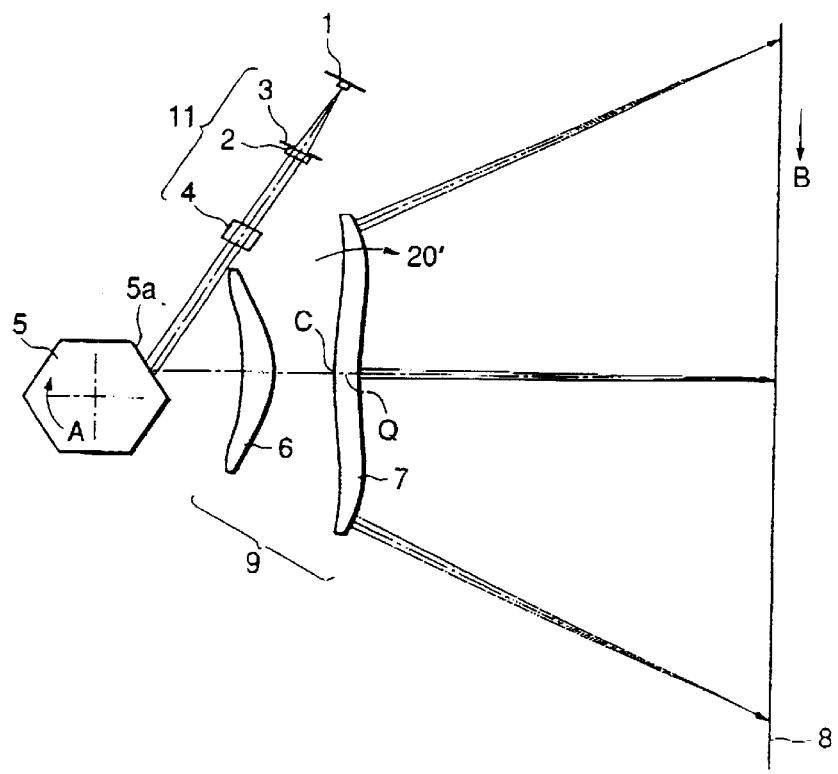
FIGS. 7A and 7B are cross-sectional views to show the major part in the main scanning direction and in the sub-scanning direction of Embodiment 2 of the present invention.
Figure 7B:
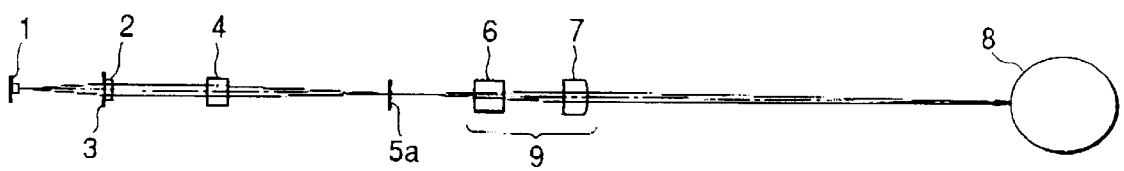

FIG. 7A is a cross-sectional view of major part in the main scanning direction (main scanning section) of Embodiment 2 of the light-scanning optical system (light-scanning apparatus) according to the present invention, and FIG. 7B a cross-sectional view of major part in the sub-scanning direction (sub-scanning section) of FIG. 7A. In the figures the same elements as those illustrated in FIGS. 1A and 1B are denoted by the same reference symbols.

The present embodiment is different from Embodiment 1 described above in that the second toric lens 7 has almost no refracting power in the main scanning section (or has substantially no refracting power) and in that the first toric lens 6 has a negative refracting power in the sub-scanning section near the symmetry axis in the main scanning direction. The other structure and optical action are substantially the same as in Embodiment 1, thereby yielding similar effects.

Namely, by employing such setting that the refracting power of the second toric lens 7 in the main scanning section is substantially null, it becomes feasible to implement good aberration correction by weakening the influence on the f-θ characteristics and on the curvature of field in the main scanning direction in the inclined arrangement of the second toric lens 7.

The phrase "the second toric lens 7 has almost no refracting power in the main scanning section" means that the following condition is met, as described previously.

$$|\phi1m/\phi2m| \geq 1000$$

The magnification of the entire system in the sub-scanning direction is set low by employing such setting that the first toric lens 6 has the negative refracting power in the sub-scanning section near the symmetry axis in the main scanning direction, which effectively corrects the difference between magnifications in the sub-scanning section. However, if the negative refracting power is set to be too strong, it will become necessary to strengthen the refracting power in the sub-scanning section of the second toric lens 7 or to set the second toric lens 7 closer to the surface to be scanned 8. Namely, if the refracting power of the second toric lens 7 in the sub-scanning section is set too strong, the optical system will become too sensitive to eccentricity tolerance or the like of the lens. Thus, it is not preferred. When the second toric lens 7 is located close to the surface to be scanned 8. the lens becomes large, so as to degrade compactness and increase the cost.

In the present embodiment the refracting powers of the respective lenses in the sub-scanning section are set to satisfy aforementioned Conditions (1), (3). Further, they are also set to satisfy aforementioned Conditions (2), (4).

Table 2 presents various characteristics of the single-beam light-scanning optical system in Embodiment 2.

In Table 2 R, k, $B_4$ to $B_{10}$, r, and $D_2$ to $D_{10}$ have the same meanings as the coefficients described in Embodiment 1.

Figure 8:
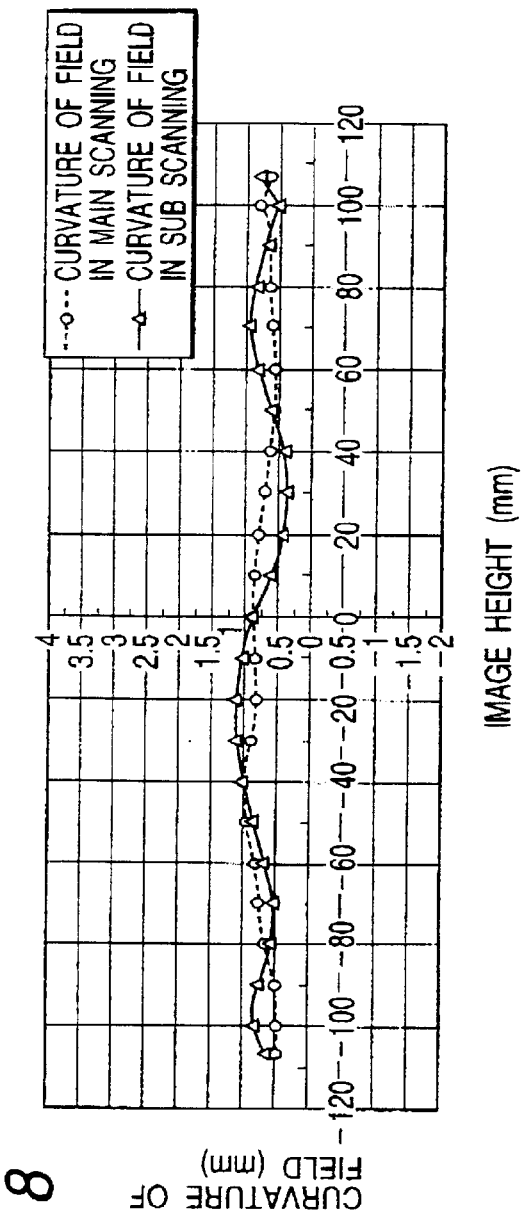
FIG. 8 is an aberration diagram to show the curvature of field in the main scanning direction and in the sub-scanning direction of Embodiment 2 of the present invention.
Figure 9:
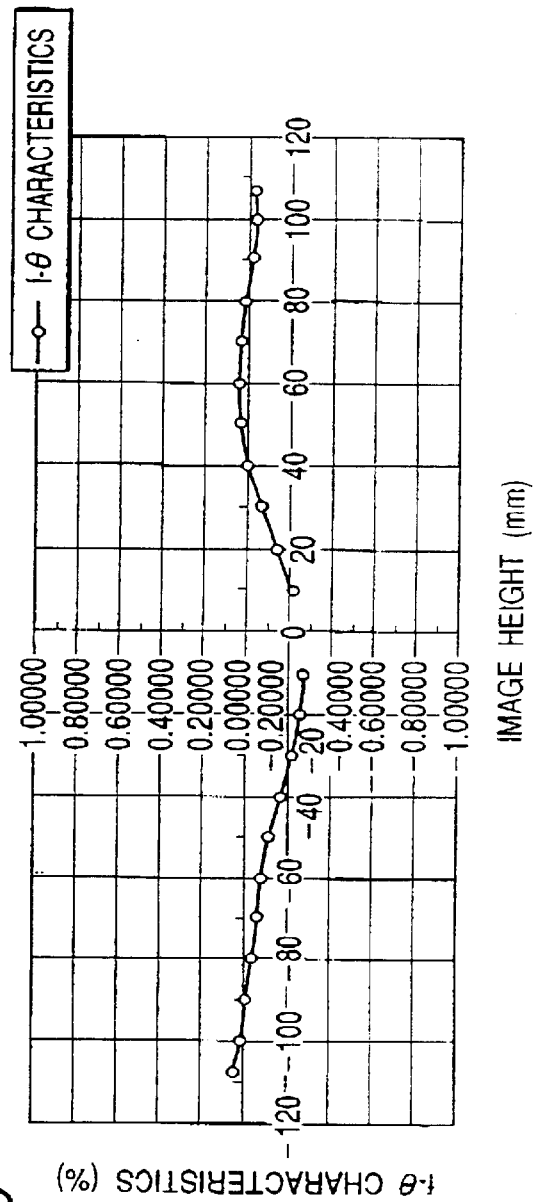
FIG. 9 is an aberration diagram to show the f-θ characteristics of Embodiment 2 of the present invention.
Figure 10:
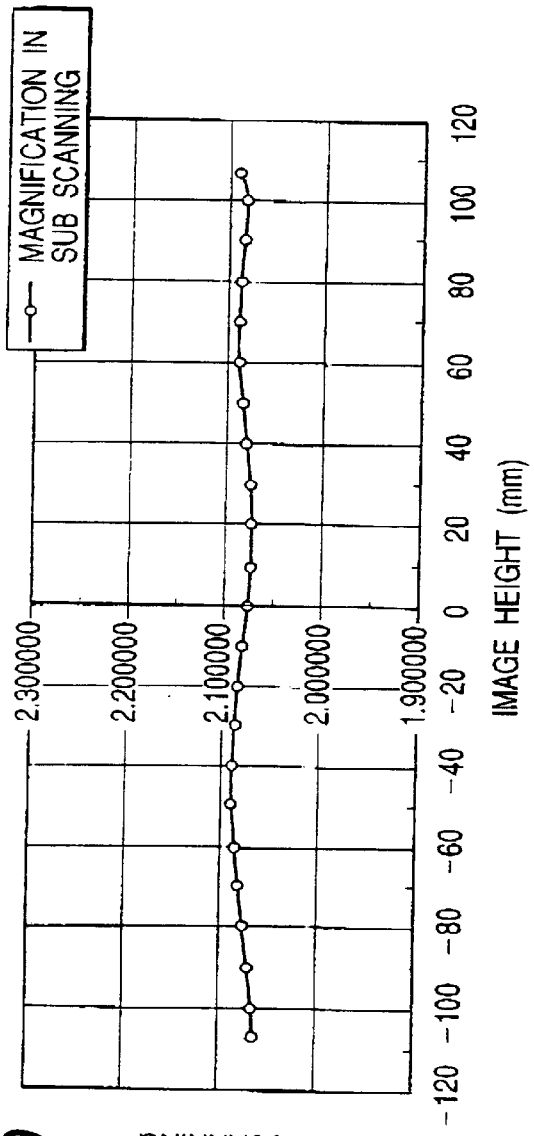
FIG. 10 is a diagram to show magnifications in the sub-scanning section of Embodiment 2 of the present invention.
Figure 11:
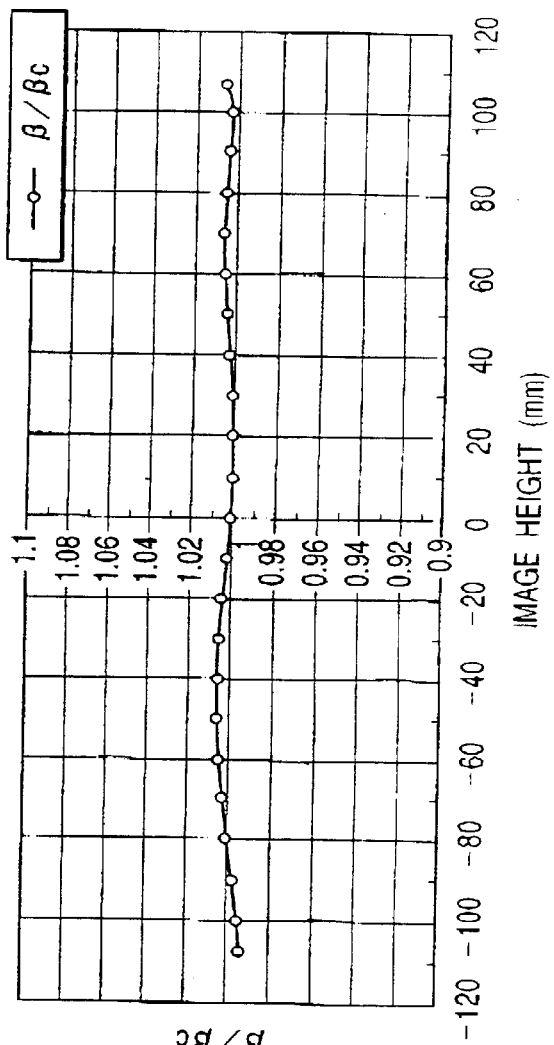
FIG. 11 is a diagram to show β/βc of Embodiment 2 of the present invention.

FIG. 8 is an aberration diagram to show the curvature of field in the main scanning direction and in the sub-scanning direction of the present embodiment, FIG. 9 an aberration diagram to show the f-θ characteristics of the present embodiment, FIG. 10 an explanatory diagram to show the lateral magnifications in the sub-scanning section across the entire scanning area, and FIG. 11 an explanatory diagram to show the relation of β/βc. It is apparent from each of the figures that each of the aberrations is corrected well to a level in which there arises no problem in practical use.

<Embodiment 3>

Figure 12A:
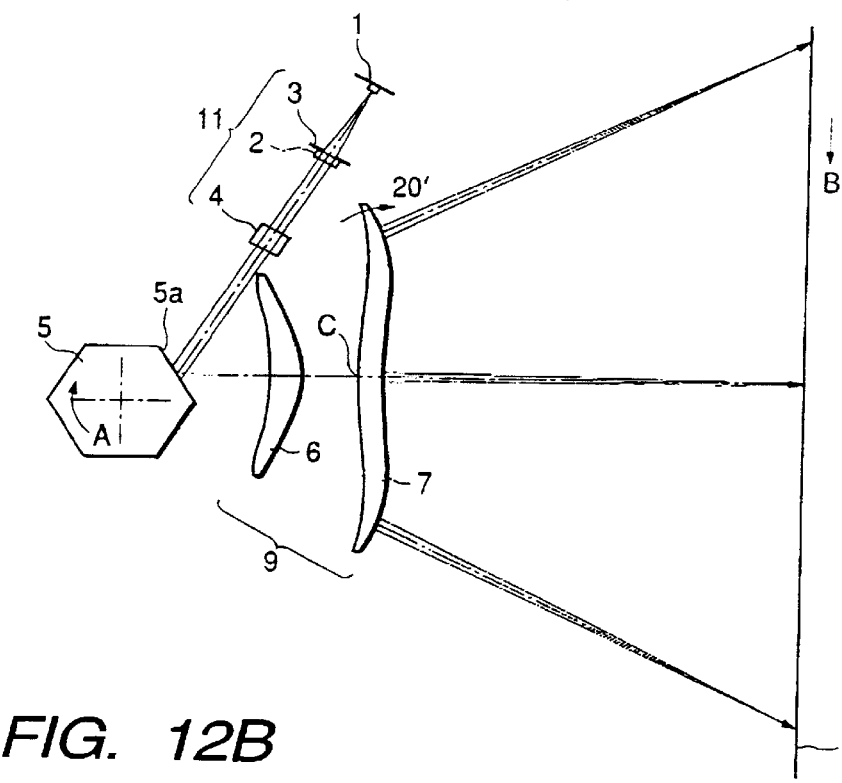
FIGS. 12A and 12B are cross-sectional views to show the major part in the main scanning direction and in the sub-scanning direction of Embodiment 3 of the present invention.
Figure 12B:
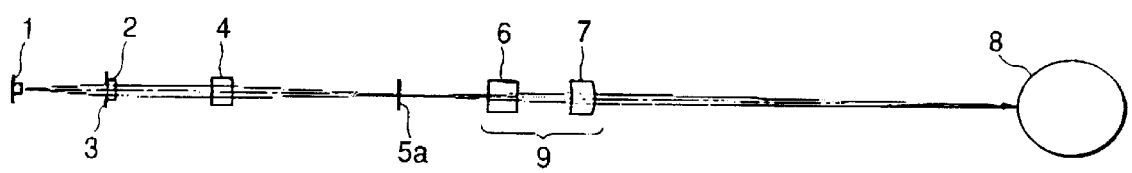

FIG. 12A is a cross-sectional view of major part in the main scanning direction (main scanning section) in Embodiment 3 of the light-scanning optical system (light-scanning apparatus) according to the present invention, and FIG. 12B a cross-sectional view of major part in the sub-scanning direction (sub-scanning section) of FIG. 12A. In the figures the same elements as those illustrated in FIGS. 1A and 1B are denoted by the same reference symbols.

Figure 12C:
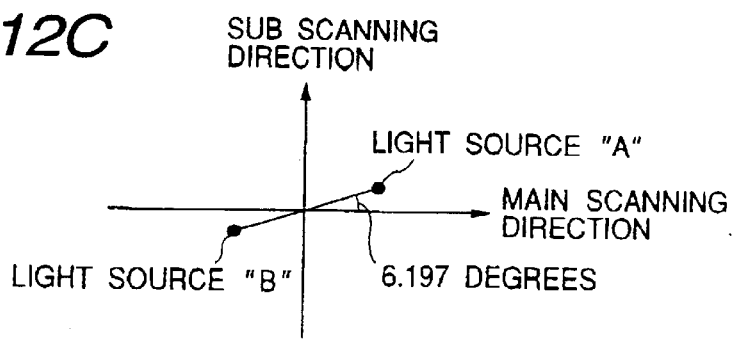
FIG. 12C is a drawing to show a layout of a monolithic multi-beam laser.

The present embodiment is different from Embodiment 1 described previously in that the optical system is constructed as a multi-beam light-scanning optical system using the multi-beam laser having a plurality of light-emitting points as the light source means. In the present embodiment the multi-beam light source is a monolithic multi-beam laser having two light-emitting points and the spacing of 90 μm between the light-emitting points, and is arranged at the inclination of 6.197° relative to the main scanning plane as illustrated in FIG. 12C.

In the present embodiment the number of light-emitting points is 2, but the present invention is not limited to it and is also applicable to configurations including three or more light-emitting points, with similar effects. Since the present invention is directed to solving the problem of the curve of scanning lines, the effects of the present invention are also achieved if the number of light-emitting points becomes 3, 4, or more.

The monolithic multi-beam laser was used as the multi-beam light source in the present embodiment, but similar effects are also achieved in the case of a hybrid multi-beam laser, without having to be limited to the monolithic multi-beam laser. The other structure and optical action are substantially the same as in Embodiment 1, thereby achieving the like effects.

Namely, in the present embodiment the multi-beam light-scanning optical system using the multi-beam laser is constructed in such structure that in the main scanning section of the second toric lens 7, similar to in aforementioned Embodiment 1, the symmetry axis Q in the main scanning direction of the lens 7 is inclined relative to the normal to the surface to be scanned 8 so as to bring the end of the lens 7 on the light source means 1 side away from the optical deflector 5. In other words, the difference between magnifications in the sub-scanning section between on the scanning start side and on the scanning end side is perfectly corrected by inclining the second toric lens 7 by 20' (20 minutes) in the direction of arrow D in the figure and toward the surface to be scanned a about point C on the optical axis of the lens 7.

This can equalize pitch intervals between the plural beams in the sub-scanning direction across the entire scanning area on the surface to be scanned 8, thus yielding the multi-beam light-scanning optical system adaptable for output of image with high quality.

Table 3 presents various characteristics of the light-scanning optical system in Embodiment 3.

In Table 3 R, k, $B_4$ to $B_{10}$, r, and $D_2$ to $D_{10}$ have the same meanings as the coefficients described in Embodiment 1.

Figure 13:
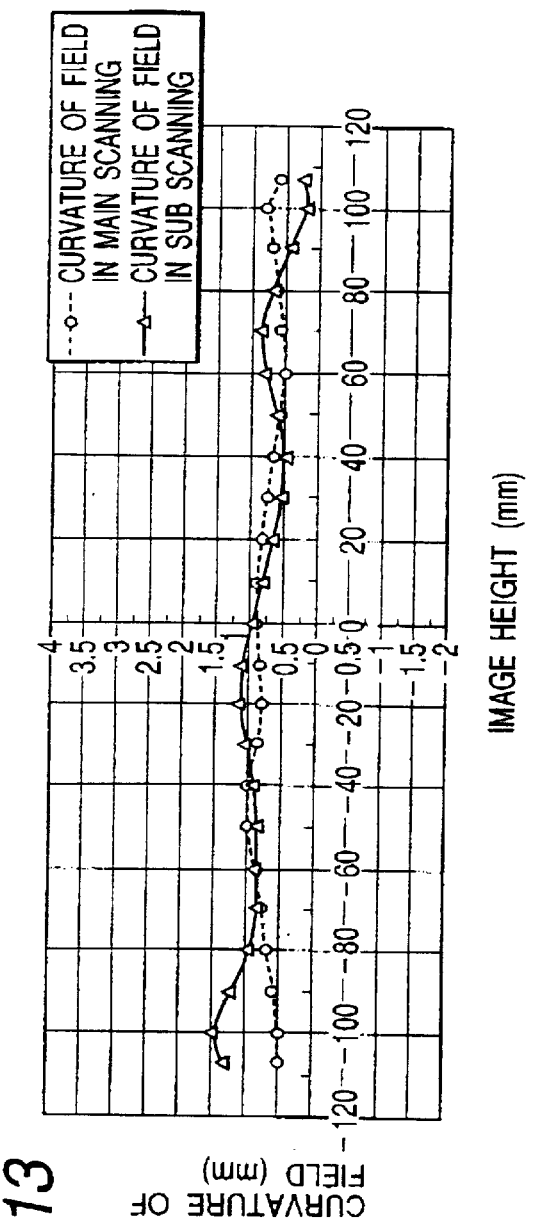
FIG. 13 is an aberration diagram to show the curvature of field in the main scanning direction and in the sub-scanning direction of Embodiment 3 of the present invention.
Figure 14:
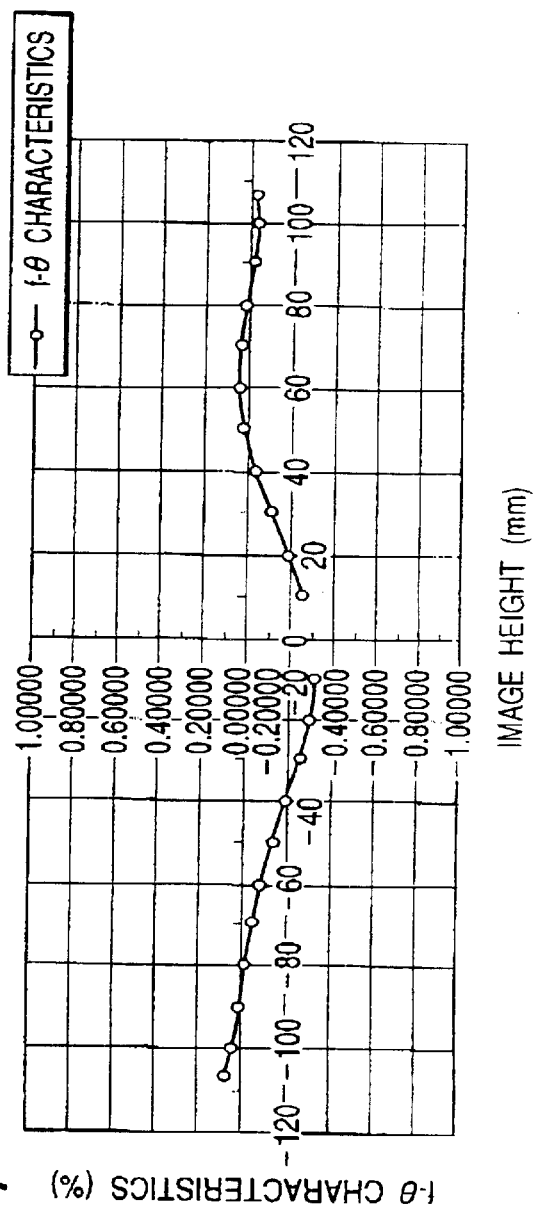
FIG. 14 is an aberration diagram to show the f-θ characteristics of Embodiment 3 of the present invention.
Figure 15:
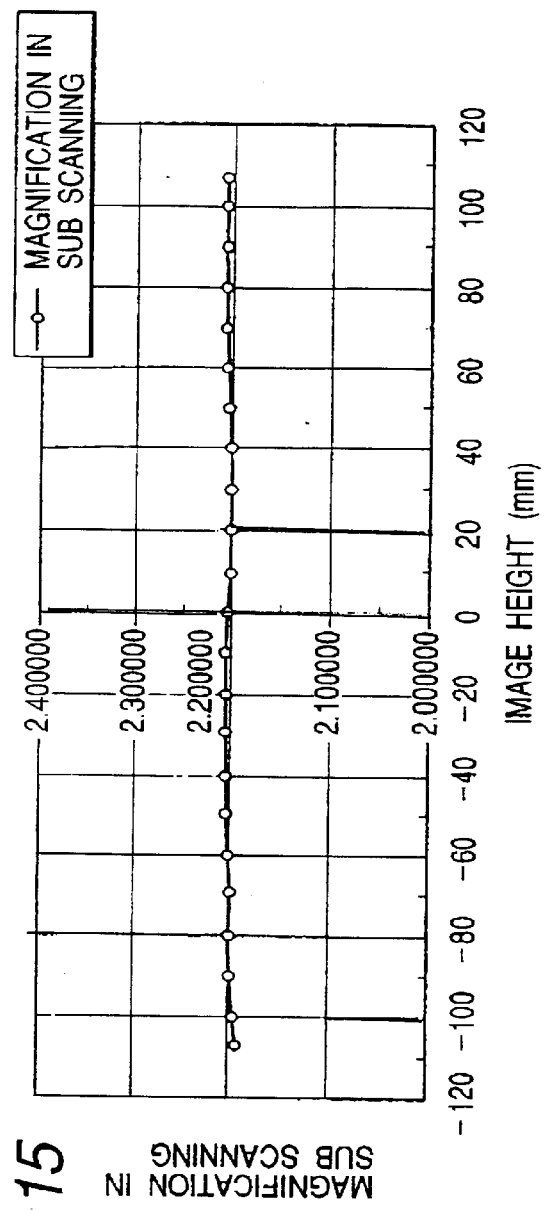
FIG. 15 is a diagram to show magnifications in the sub-scanning section of Embodiment 3 of the present invention.
Figure 16:
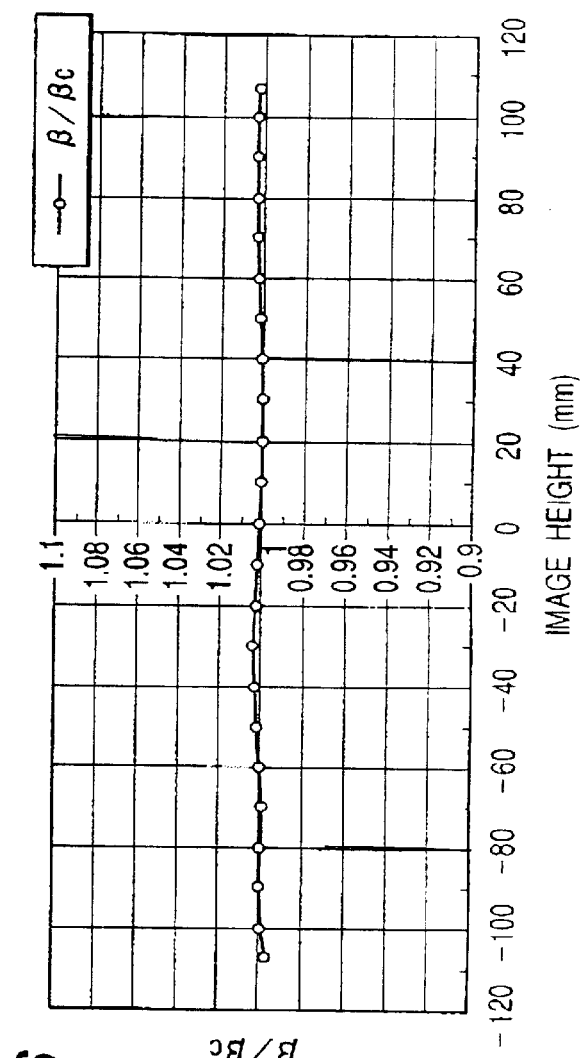
FIG. 16 is a diagram to show β/βc of Embodiment 3 of the present invention.
Figure 17:
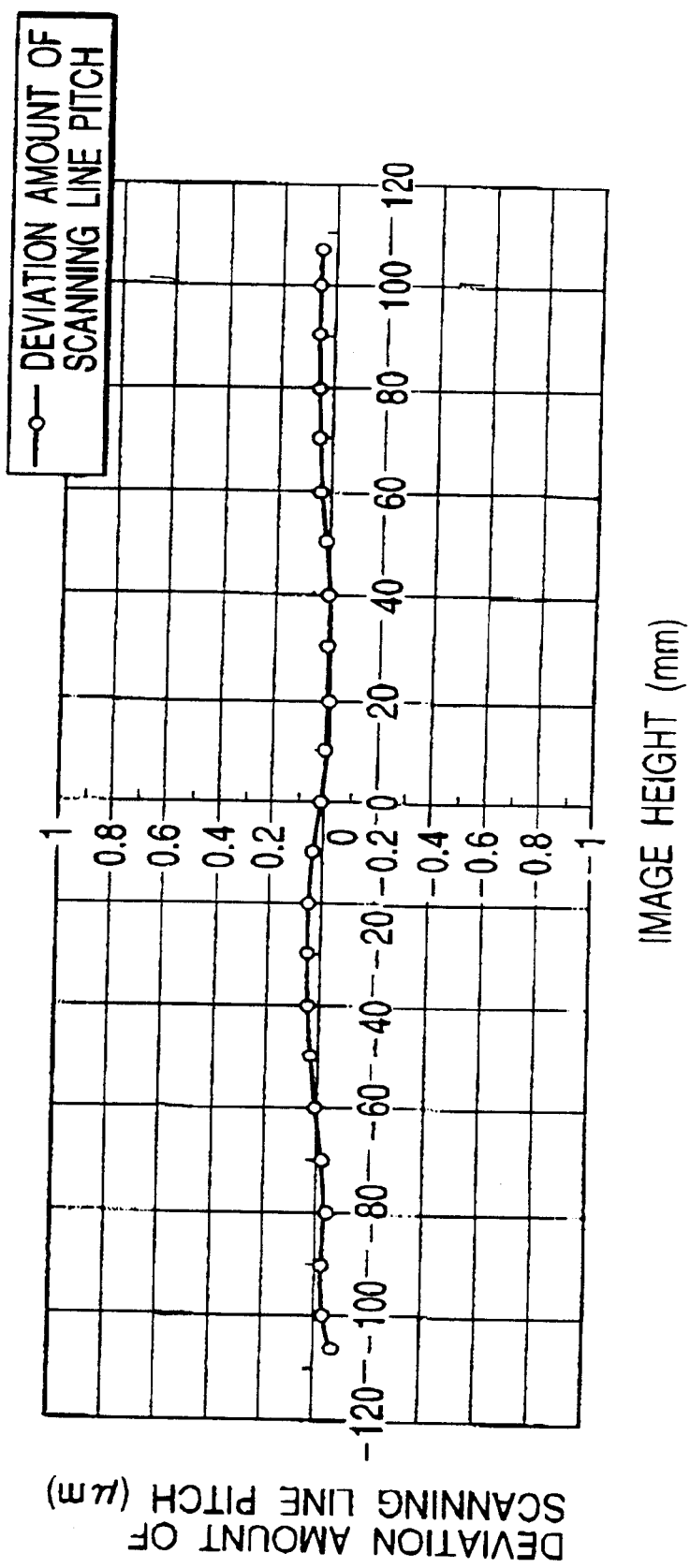
FIG. 17 is a diagram to show pitch deviation amounts of respective scan lines of multiple beams in Embodiment 3 of the present invention.

FIG. 13 is an aberration diagram to show the curvature of field in the main scanning direction and in the sub-scanning direction of the present embodiment, FIG. 14 an aberration diagram to show the f-θ characteristics of the present embodiment, FIG. 15 an explanatory diagram to show the lateral magnifications in the sub-scanning section across the entire scanning area, and FIG. 16 an explanatory diagram to show the relation of β/βc. FIG. 17 is an explanatory diagram to show pitch deviation amounts of scanning lines of multiple beams in the case wherein the multi-beam light-scanning optical system of the present embodiment is used in the resolution of 600 dpi (the spacing between scanning lines: 42.3 μm). It is apparent from each of the figures that each of the aberrations is corrected well to the level in which there arises no problem in practical use.

The third optical system was composed of two lenses in each of the above embodiments, but the present invention can also be applied to configurations of a single lens, or three or more lenses in similar fashion to each of the above embodiments if the lens or lenses are set to satisfy the aforementioned requirements.

The optical element constituting the third optical system of the present invention is not limited to the f-θ lens system 9 (first toric lens 6 and second toric lens 7) in Embodiments 1 to 3, but it may include a reflecting mirror. The third optical system may include a diffraction optical element.

In Embodiments 1 to 3 of the present invention only the second toric lens 7 was inclined in the direction of arrow D in the figure and toward the surface to be scanned 8 about the point C on the optical axis of the lens 7, but the present invention is not limited to this structure and can also exhibit the effects similar to those in Embodiments 1 to 3, in structure in which only the first toric lens 6 is inclined in the direction of arrow D in the figure and toward the surface to be scanned 8 about the point C on the optical axis of the lens 6.

The effects similar to those in Embodiments 1 to 3 can also be achieved by employing such structure that the second toric lens 7 is replaced by a reflecting mirror and that the reflecting mirror is inclined in the direction of the arrow D in the figure and toward the surface to be scanned 8 about the point on the optical axis of the reflecting mirror.

In that case, it is preferable to set the optical power of the inclined mirror large in the sub-scanning section and the optical power of the inclined mirror small in the main scanning section.

The effects similar to those in Embodiments 1 to 3 can also be achieved by employing such structure that the second toric lens 7 is replaced by an optical element including a diffraction optical element and that the optical element including the diffraction optical element is inclined in the direction of arrow D in the figure and toward the surface to be scanned 8 about the point on the optical axis of the optical element including the diffraction optical element.

In that case, it is preferable to set the power of the inclined optical element including the diffraction optical element large in the sub-scanning section and the power of the inclined optical element including the diffraction optical element small in the main scanning section.

Further, the effects similar to those in Embodiments 1 to 3 can also be achieved by such arrangement that the first toric lens 6 and the second toric lens both are inclined in the direction of arrow D in the figure and toward the surface to be scanned 8 about the point on the optical axis. Namely, the effects similar to those in Embodiments 1 to 3 are attained when the number of lenses in the third lens system, inclined in the direction of arrow D in the figure and toward the surface to be scanned 8, is a plural number, i.e., not less than 2.

As described previously, according to the present invention, if the third lens system consists of one lens, the one lens needs to be inclined in the direction of arrow D in the figure and toward the surface to be scanned 8. If the third lens system consists of three or more lenses, the effects similar to those in Embodiments 1 to 3 are achieved by employing inclined arrangement of at least one lens out of the three or more lenses in the direction of arrow D in the figure.

Figure 18:
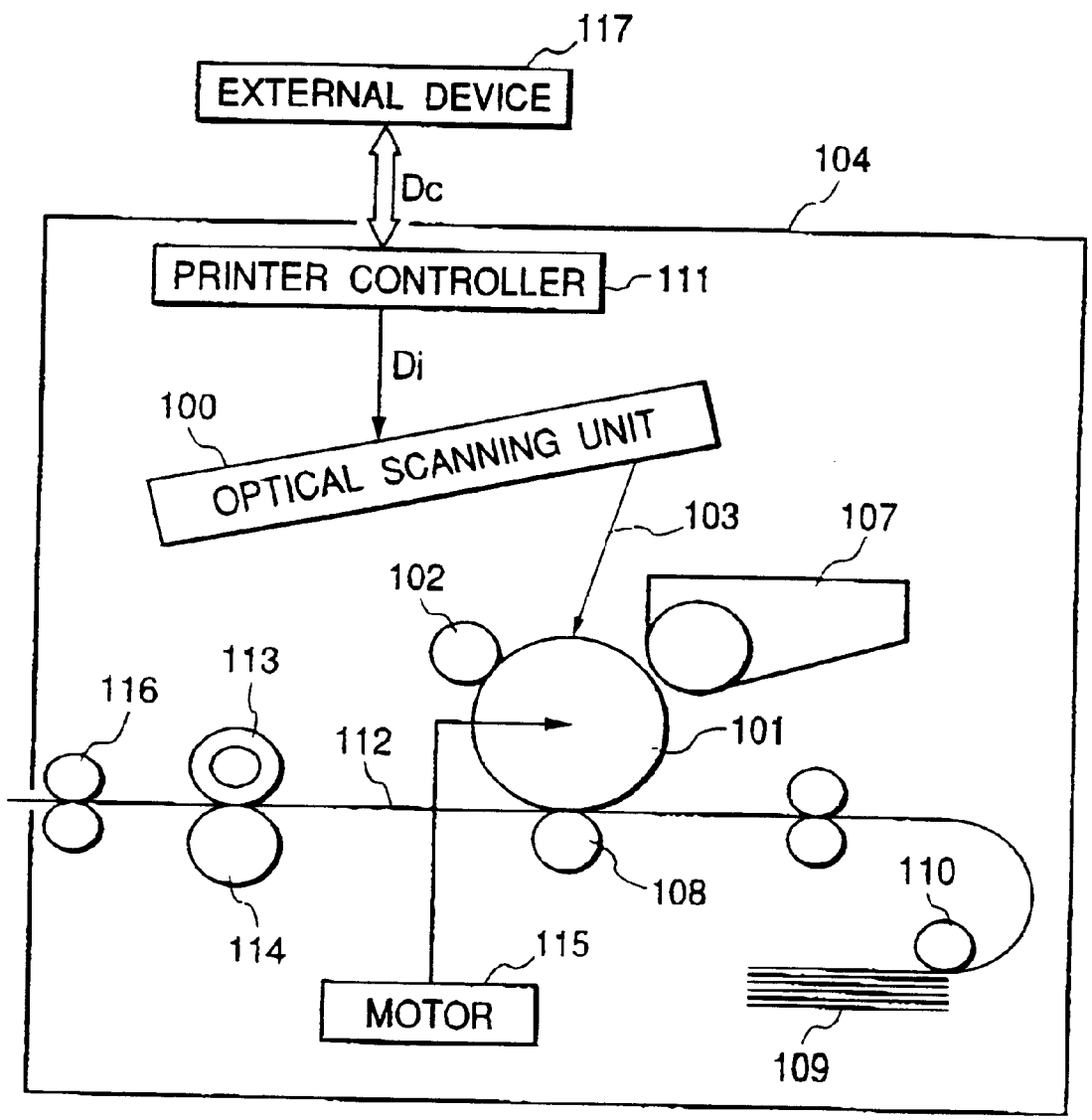
FIG. 18 is a cross-sectional view of major part in the sub-scanning direction to show a configuration example of an electrophotographic printer using the light-scanning optical system of the present invention.
Figure 19:
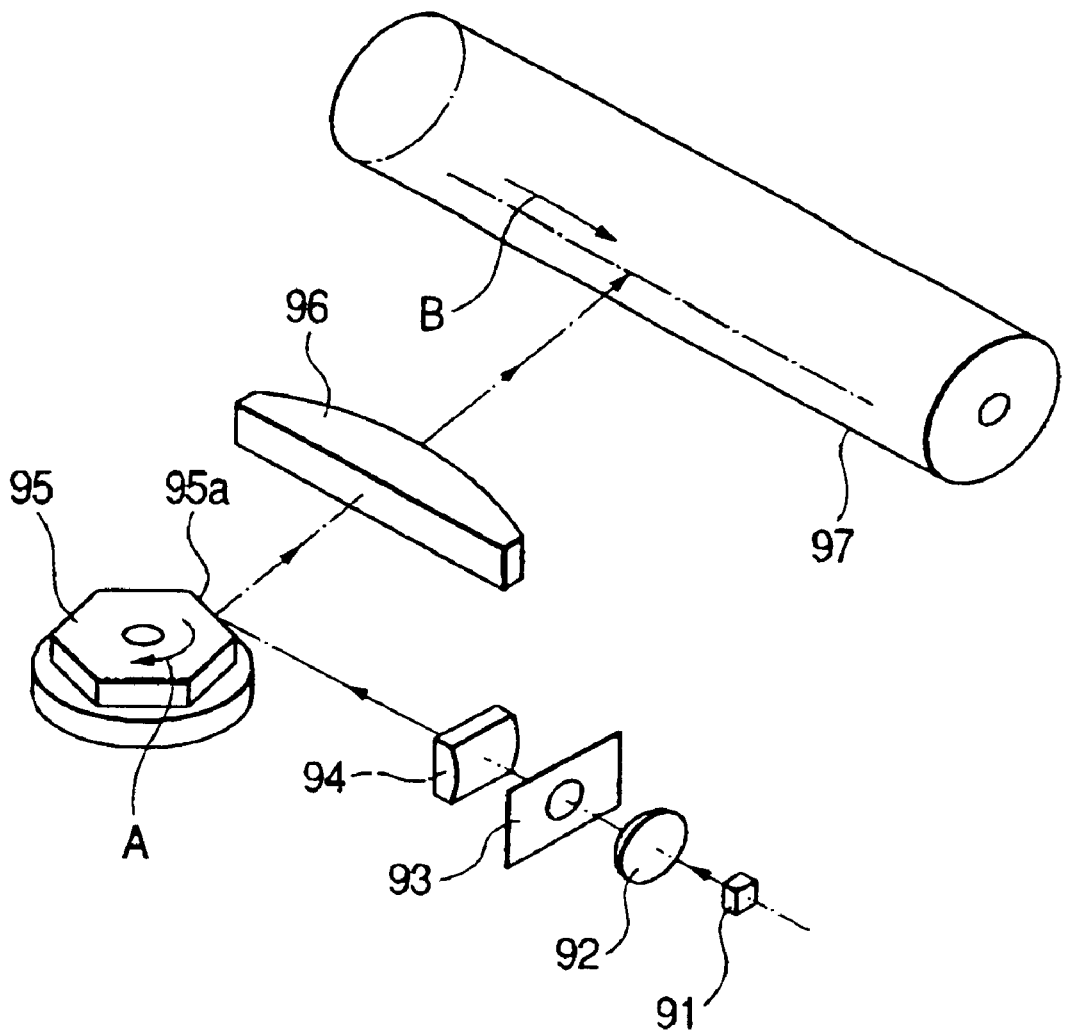
FIG. 19 is a schematic view to show the major part of the conventional light-scanning optical system.

FIG. 18 is a cross-sectional view of major part along the sub-scanning direction to show an embodiment of image-forming apparatus of the present invention. In FIG. 18, numeral 104 designates the image-forming apparatus. This image-forming apparatus 104 accepts Input of code data Dc from an external device 117 such as a personal computer or the like. This code data Dc is converted into image data (dot data) Di by a printer controller 111 in the apparatus. This image data Di is supplied to an optical scanning unit 100 having the structure as described in either of Embodiments 1 to 3. This optical scanning unit 100 outputs an optical beam 103 modulated according to the image data Di and this light beam 103 scans a photosensitive surface of photosensitive drum 101 in the main scanning direction.

The photosensitive drum 101 as an electrostatic latent image carrier (photosensitive body) is rotated clockwise by a motor 115. With the rotation thereof, the photosensitive surface of the photosensitive drum 101 moves in the sub-scanning direction perpendicular to the main scanning direction, relative to the light beam 103. Above the photosensitive drum 101, a charging roller 102 for uniformly charging the surface of the photosensitive drum 101 is disposed so as to contact the surface. Then the surface of the photosensitive drum 101 charged by the charging roller 102 is exposed to the light beam 103 under scanning by the optical scanning unit 100.

As described previously, the light beam 103 is modulated based on the image data Di and an electrostatic latent image is formed on the surface of the photosensitive drum 101 under irradiation with this light beam 103. This electrostatic latent image is developed into a toner image by a developing unit 107 disposed so as to contact the photosensitive drum 101 downstream in the rotating direction of the photosensitive drum 101 from the irradiation position of the light beam 101.

The toner image developed by the developing unit 107 is transferred onto a sheet 112 being a transfer medium, by a transfer roller 108 opposed to the photosensitive drum 101 below the photosensitive drum 101. Sheets 112 are stored in a sheet cassette 109 in front of (i.e., on the right side in FIG. 18) of the photosensitive drum 101. but sheet feeding can also be implemented by hand feeding. A sheet feed roller 110 is disposed at an end of the sheet cassette 109 and feeds each sheet 112 in the sheet cassette 109 into the conveyance path.

The sheet 112, onto which the toner image unfixed was transferred as described above, is further transferred to a fixing unit located behind the photosensitive drum 101 (i.e., on the left side in FIG. 18). The fixing unit is composed of a fixing roller 113 having a fixing heater (not illustrated) inside and a pressing roller 114 disposed in press contact with the fixing roller 113 and heats while pressing the sheet 112 thus conveyed from the transfer part, in the nip part between the fixing roller 113 and the pressing roller 114 to fix the unfixed toner image on the sheet 112. Sheet discharge rollers 116 are disposed further behind the fixing roller 113 to discharge the fixed sheet 112 to the outside of the image-forming apparatus.

Although not illustrated in FIG. 18, the print controller 111 also performs control of each section in the image-forming apparatus, including the motor 115, and control of a polygon motor etc. in the optical scanning unit described above, in addition to the conversion of data described above.

According to the present invention, as described above, the light-scanning optical system (multi-beam light-scanning optical system) or the light-scanning apparatus (multi-beam light-scanning apparatus) wherein the beam entering the f-θ lens system is the nearly parallel beam is constructed in the structure in which in the main scanning section at least one lens making the f-θ lens system is arranged so that the symmetry axis of the lens in the main scanning direction is inclined relative to the normal to the surface to be scanned, so as to bring the end of the lens on the light source means side away from the deflecting means, whereby spot sizes are equalized throughout the entire surface to be scanned, thereby attaining the light-scanning optical system and light-scanning apparatus capable of presenting the image at high speed and with high quality, free of curving of scanning line, and with image-forming apparatus using it.

TABLE 1

| Operating wavelength | λ (nm) | 780 |
| --- | --- | --- |
| light source-stop surface | d0 | 23.17 |
| stop surface-first surface of collimator lens | d1 | 0.50 |
| thickness of collimator lens | d2 | 2.00 |
| second surface of collimator lens-first surface of cylindrical lens | d3 | 22.26 |
| thickness of cylindrical lens | d4 | 6.00 |
| cylindrical lens-polygon surface | d5 | 48.38 |
| polygon surface-first surface of first toric lens | d6 | 24.50 |
| thickness of first toric lens | d7 | 8.00 |
| second surface of first toric lens-first surface of | d8 | 15.37 |

TABLE 1-continued

| | | |
|---|---|---|
| second toric lens | | |
| thickness of second toric lens | d9 | 7.00 |
| second surface of second toric lens-surface to be scanned | d10 | 119.08 |
| refractive index of collimator lens | Ncol | 1.76203 |
| refractive index of cylindrical lens | Ncyl | 1.51072 |
| refractive index of first toric lens | Ntor1 | 1.52420 |
| refractive index of second toric lens | Ntor2 | 1.52420 |
| focal length of fθ lens | f | 136.237 |
| angle of incidence to polygon | α | 60.00 |
| maximum angle of emergence from polygon | θ | 45.00 |
| polygon | φ40 hexahedron | | shape of collimator lens

| first surface | | second surface | |
|---|---|---|---|
| R | 182.212 | R | −20.831 | shape of cylindrical lens

| first surface | | second surface | |
|---|---|---|---|
| R | ∞ | R | ∞ |
| r | 26.993 | | |

| | |
|---|---|
| φ1m/φ2m | 113.66327 |
| φ1s/φ2s | 0.01224 |
| βc | 2.16994 | shape of fθ lens

| first surface | | second surface | |
|---|---|---|---| first toric lens

| | | | |
|---|---|---|---|
| R | −62.044 | R | −35.199 |
| k | −4.611E+00 | k | −2.130E+00 |
| B4 | 2.852E−06 | B4 | −4.482E−07 |
| B6 | 0.000E+00 | B6 | 2.061E−09 |
| B8 | 0.000E+00 | B8 | −2.364E−14 |
| B10 | 0.000E+00 | B10 | 0.000E+00 |
| r | −67.000 | r | −67.000 |
| D2 | 0.000E+00 | D2u | −1.650E−03 |
| D4 | 0.000E+00 | D4u | 2.206E−06 |
| D6 | 0.000E+00 | D6u | −1.090E−09 |
| D8 | 0.000E+00 | D8u | 0.000E+00 |
| D10 | 0.000E+00 | D10u | 0.000E+00 |
| | | D21 | −1.885E−03 |
| | | D41 | 3.449E−06 |
| | | D61 | −2.311E−09 |
| | | D81 | 0.000E+00 |
| | | D101 | 0.000E+00 | second toric lens

| | | | |
|---|---|---|---|
| R | 88.196 | R | 86.700 |
| k | −5.328E−01 | k | −1.696E+01 |
| B4 | −4.527E−06 | B4 | −3.217E−06 |
| B6 | 2.280E−09 | B6 | 1.395E−09 |
| B8 | −7.458E−13 | B8 | −3.761E−13 |
| B10 | 8.424E−17 | B10 | 2.166E−17 |
| r | −37.273 | r | −13.843 |
| D2 | 3.260E−03 | D2 | 1.210E−03 |
| D4 | 3.312E−06 | D4 | −9.234E−07 |
| D6 | 9.283E−10 | D6 | 4.905E−10 |
| D8 | 4.979E−14 | D8 | −1.640E−13 |
| D10 | 1.994E−17 | D10 | 2.437E−17 |

TABLE 2

| | | |
|---|---|---|
| Operating wavelength | λ (nm) | 780 |
| light source-stop surface | d0 | 23.17 |
| stop surface-first surface of collimator lens | d1 | 0.50 |
| thickness of collimator lens | d2 | 2.00 |
| second surface of collimator lens-first surface of cylindrical lens | d3 | 22.26 |

TABLE 2-continued

| | | |
|---|---|---|
| thickness of cylindrical lens | d4 | 6.00 |
| cylindrical lens-polygon surface | d5 | 48.38 |
| polygon surface-first surface of first toric lens | d6 | 24.50 |
| thickness of first toric lens | d7 | 8.00 |
| second surface of first toric lens-first surface of second toric lens | d8 | 15.37 |
| thickness of second toric lens | d9 | 7.00 |
| second surface of second toric lens-surface to be scanned | d10 | 119.08 |
| refractive index of collimator lens | Ncol | 1.76203 |
| refractive index of cylindrical lens | Ncyl | 1.51072 |
| refractive index of first toric lens | Ntor1 | 1.52420 |
| refractive index of second toric lens | Ntor2 | 1.52420 |
| focal length of fθ lens | f | 136.237 |
| angle of incidence to polygon | α | 60.00 |
| maximum angle of emergence from polygon | θ | 45.00 |
| polygon | φ40 hexahedron | | shape of collimator lens

| first surface | | second surface | |
|---|---|---|---|
| R | 182.212 | R | −20.831 | shape of cylindrical lens

| first surface | | second surface | |
|---|---|---|---|
| R | ∞ | R | ∞ |
| r | 26.993 | | |

| | |
|---|---|
| φ1m/φ2m | 241929.887 |
| φ1s/φ2s | 0.08090 |
| βc | 2.07713 | shape of fθ lens

| first surface | | second surface | |
|---|---|---|---| first toric lens

| | | | |
|---|---|---|---|
| R | −65.605 | R | −36.155 |
| k | −4.815E+00 | k | −2.081E+00 |
| B4 | 2.936E−06 | B4 | −2.244E−07 |
| B6 | −2.957E−11 | B6 | 1.927E−09 |
| B8 | 0.000E+00 | B8 | 1.417E−14 |
| B10 | 0.000E+00 | B10 | −4.654E−18 |
| r | −55.000 | r | −75.000 |
| D2 | 0.000E+00 | D2u | −1.798E−03 |
| D4 | 0.000E+00 | D4u | 2.163E−06 |
| D6 | 0.000E+00 | D6u | −8.845E−10 |
| D8 | 0.000E+00 | D8u | 0.000E+00 |
| D10 | 0.000E+00 | D10u | 0.000E+00 |
| | | D21 | −2.135E−03 |
| | | D41 | 3.791E−06 |
| | | D61 | −2.513E−D9 |
| | | D81 | 0.000E+00 |
| | | D101 | 0.000E+00 | second toric lens

| | | | |
|---|---|---|---|
| R | 88.196 | R | 85.789 |
| k | −4.182E−01 | k | −1.607E+01 |
| B4 | −4.662E−06 | B4 | −3.300E−06 |
| B6 | 2.351E−09 | B6 | 1.445E−09 |
| B8 | −7.542E−13 | B8 | −3.806E−13 |
| B10 | 8.319E−17 | B10 | 2.186E−17 |
| r | −37.973 | r | −13.727 |
| D2 | 3.518E−03 | D2 | 1.247E−03 |
| D4 | 3.625E−06 | D4 | −1.046E−06 |
| D6 | 1.014E−09 | D6 | 6.183E−10 |
| DB | 4.958E−14 | D8 | −2.203E−13 |
| D10 | 1.981E−17 | D10 | 3.325E−17 |

TABLE 3

| | | | |
|---|---|---|---|
| Operating wavelength | λ (nm) | | 780 |
| light source-stop surface | d0 | | 23.17 |
| stop surface-first surface of collimator lens | d1 | | 0.50 |
| thickness of collimator lens | d2 | | 2.00 |
| second surface of collimator lens-first surface of cylindrical lens | d3 | | 22.26 |
| thickness of cylindrical lens | d4 | | 6.00 |
| cylindrical lens-polygon surface | d5 | | 48.38 |
| polygon surface-first surface of first toric lens | d6 | | 24.50 |
| thickness of first toric lens | d7 | | 8.00 |
| second surface of first toric lens-first surface of second toric lens | d8 | | 15.37 |
| thickness of second toric lens | d9 | | 7.00 |
| second surface of second toric lens-surface to be scanned | d10 | | 119.08 |
| refractive index of collimator lens | Ncol | | 1.76203 |
| refractive index of cylindrical lens | Ncyl | | 1.51072 |
| refractive index of first toric lens | Ntor1 | | 1.52420 |
| refractive index of second toric lens | Ntor2 | | 1.52420 |
| focal length of fθ lens | f | | 136.237 |
| angle of incidence to polygon | α | | 60.00 |
| maximum angle of emergence from polygon | θ | | 45.00 |
| polygon | φ40 hexahedron | | | shape of collimator lens

| first surface | | second surface | |
|---|---|---|---|
| R | 182.212 | R | −20.831 | light source

| | |
|---|---|
| number of light-emitting points | 2 |
| spacing between light-emitting points | 0.09 | shape of cylindrical lens

| first surface | | second surface | |
|---|---|---|---|
| R | ∞ | R | ∞ |
| r | 26.993 | | |

| | |
|---|---|
| φ1m/φ2m | 113.66327 |
| φ1s/φ2s | 0.05519 |
| βc | 2.19946 | shape of fθ lens

| first surface | | second surface | |
|---|---|---|---|
| first toric lens | | | |
| R | −62.044 | R | −35.199 |
| k | −4.611E+00 | k | −2.130E+00 |
| B4 | 2.852E−06 | B4 | −4.482E−07 |
| B6 | 0.000E+00 | B6 | 2.061E−09 |
| B8 | 0.000E+00 | B8 | −2.364E−14 |
| B10 | 0.000E+00 | B10 | 0.000E+00 |
| r | −67.000 | r | −67.000 |
| D2 | 8.251E−04 | D2u | −3.492E−04 |
| D4 | 1.049E−06 | D4u | −1.375E−06 |
| D6 | 0.000E+00 | D6u | 2.292E−09 |
| D8 | 0.000E+00 | D8u | 0.000E+00 |
| D10 | 0.000E+00 | D10u | 0.000E+00 |
| | | D2l | −5.847E−04 |
| | | D4l | −1.466E−07 |
| | | D6l | 1.416E−09 |
| | | D8l | 0.000E+00 |
| | | D10l | 0.000E+00 |
| second toric lens | | | |
| R | 88.196 | R | 86.700 |
| k | −5.328E−01 | k | −1.696E+01 |
| B4 | −4.527E−06 | B4 | −3.217E−06 |
| B6 | 2.280E−09 | B6 | 1.395E−09 |
| B8 | −7.458E−13 | B8 | −3.761E−13 |
| B10 | 8.424E−17 | B10 | 2.166E−17 |
| r | −37.155 | r | −13.974 |

TABLE 3-continued

| | | | |
|---|---|---|---|
| D2 | 3.497E−03 | D2 | 1.243E−03 |
| D4 | 3.687E−06 | D4 | −1.081E−06 |
| D6 | −4.778E−11 | D6 | 6.651E−10 |
| D8 | 4.803E−14 | D8 | −2.401E−13 |
| D10 | 1.891E−17 | D10 | 3.569E−17 |

What is claimed is:

1. A light-scanning optical system comprising a first optical system for converting a beam emitted from light source means into a nearly parallel beam, a second optical system for focusing the converted beam into a linear beam along a main scanning direction on a deflection facet of deflecting means, and a third optical system for focusing the nearly parallel beam in a main scanning section, deflected by the deflecting means, on a surface to be scanned, said light-scanning optical system being constructed so that an optical axis of an incidence optical system including said first optical system and said second optical system is inclined relative to a normal to the surface to be scanned, at least in the main scanning section, wherein said third optical system comprises at least one optical element and said at least one optical element is arranged so that in the main scanning section a symmetry axis in the main scanning direction of said optical element is inclined relative to the normal to the surface to be scanned, so as to bring an end of said optical element on the light source means side away from the deflecting means.

2. The light-scanning optical system according to claim 1, wherein said optical element arranged as inclined is a lens.

3. The light-scanning optical system according to claim 1, wherein said optical element arranged as inclined is a reflecting mirror.

4. The light-scanning optical system according to claim 1, wherein said optical element arranged as inclined includes a diffraction optical element.

5. The light-scanning optical system according to claim 2, wherein said third optical system comprises two lenses.

6. The light-scanning optical system according to claim 5, wherein a lens disposed on the surface-to-be-scanned side out of said two lenses of said third optical system has a larger refracting power in a sub-scanning section than that of a lens disposed on the deflecting means side.

7. The light-scanning optical system according to claim 5, wherein a lens of said two lenses that is inclined is disposed on the surface-to-be-scanned side of said third optical system.

8. The light-scanning optical system according to claim 5, wherein an optical axis of one lens of said two lenses of said third optical system is arranged to be shifted by a predetermined distance in the main scanning direction, relative to an optical axis of the other lens.

9. The light-scanning optical system according to claim 5, wherein said two lenses of said third optical system are first and second toric lenses arranged, from the deflective means side, with said first toric lens first followed by said second toric lens, wherein said first toric lens has at least one lens surface of aspherical shape in the main scanning section and is formed in meniscus shape of a positive refracting power with a concave surface facing to the deflecting means near a symmetry axis in the main scanning direction of said first toric lens, and wherein said second toric lens has two lens surfaces of aspherical shape in the main scanning section and is formed in meniscus shape of a positive, weak refracting power or almost no refracting power with a convex surface facing the deflecting means near a symmetry axis in the main scanning direction of said second toric lens.

10. The light-scanning optical system according to claim 9, wherein said first and second toric lenses in the sub-scanning section are both of a meniscus shape with a concave surface facing the deflecting means.

11. The light-scanning optical system according to claim 9, wherein curvatures of the two lens surfaces of said second toric lens in the main scanning section continuously vary from near the symmetry axis in the main scanning direction of said second toric lens toward peripheral portions of said second toric lens and signs of the curvatures are inverted in an intermediate portion.

12. The light-scanning optical system according to claim 9, wherein the refracting power of said second toric lens in the sub-scanning section continuously varies on a symmetric basis from near the symmetry axis in the main scanning direction of said second toric lens toward peripheral portions of said second toric lens.

13. The light-scanning optical system according to claim 9, wherein the refracting power of said first toric lens in the sub-scanning section continuously varies on an asymmetric basis from near the symmetry axis in the main scanning direction of said first toric lens toward peripheral portions of said first toric lens.

14. The light-scanning optical system according to claim 9, wherein the refracting power of said first toric lens in the sub-scanning section becomes continuously stronger from near the symmetry axis in the main scanning direction of said first toric lens toward peripheral portions of said frist toric lens and the refracting power of said second toric lens in the sub-scanning section becomes continuously weaker from near the symmetry axis in the main scanning direction of said second toric lens toward peripheral portions of said second toric lens.

15. The light-scanning optical system according to claim 9, which satisfies the following condition:

$$|\phi 1s/\phi 2s| \leq 0.1,$$

where $\phi 1s$ is the refracting power of said first toric lens in the sub-scanning section near the symmetry axis in the main scanning direction and $\phi 2s$ the refracting power of said second toric lens in the sub-scanning section near the symmetry axis in the main scanning direction.

16. The light-scanning optical system according to claim 9, which satisfies the following condition:

$$|1m/\phi 2m| \geq 100,$$

where $\phi 1m$ is the refracting power of said first toric lens in the main scanning section near the symmetry axis in the main scanning direction and $\phi 2m$ the refracting power of said second toric lens in the main scanning section near the symmetry axis in the main scanning direction.

17. The light-scanning optical system according to claim 16, wherein said third optical system establishes a conjugate relation between the deflecting means and the surface to be scanned in the sub-scanning section and satisfies the following condition:

$$1.5 \leq \beta c \leq 4.0,$$

where $\beta c$ is an image magnification in the sub-scanning section near the symmetry axis of said third optical system in the main scanning direction.

18. The light-scanning optical system according to claim 16, wherein said third optical system establishes a conjugate relation between the deflecting means and the surface to be scanned in the sub-scanning section and satisfies the following condition:

$$0.9 \leq \beta/\beta c \leq 1.1 \qquad (\text{Eq. 3}),$$

where $\beta c$ is an image magnification in the sub-scanning section near the symmetry axis of said third optical system in the main scanning direction and $\beta$ is an image magnification in the sub-scanning section at an arbitrary position off the axis in the main scanning direction.

19. The light-scanning optical system according to claim 9, wherein said first toric lens and said second toric lens comprise of a plastic material.

20. The light-scanning optical system according to any one of claims 1 to 19, wherein the light source means comprises a plurality of light-emitting points.

21. An image-forming apparatus comprising the light-scanning optical system as set forth in any one of claims 1 to 19, a photosensitive member placed on the surface to be scanned, a developing unit for developing an electrostatic latent image formed on the photosensitive member by the beam by way of said light-scanning optical system, into a toner image, a transfer unit for transferring the toner image thus developed, onto a transfer medium, and a fixing unit for fixing the toner image thus transferred, on the transfer medium.

22. An image-for g apparatus comprising the light-scanning optical system as set forth in any one of claims 1 to 19, and a printer controller for converting code data supplied from an external device, into an image signal and for supplying the image signal to said light-scanning optical system.

23. An image-forming apparatus comprising the light-scanning optical system as set forth in claim 20, a photosensitive member placed on the surface to be scanned, a developing unit for developing an electrostatic latent image formed on the photosensitive member by beams by way of said light-scanning optical system, into a toner image, a transfer unit for transferring the toner image thus developed, onto a transfer medium, and a fixing unit for fixing the toner image thus transferred, on the transfer medium.

24. An image-forming apparatus comprising the light-scanning optical system as set forth in claim 20, and a printer controller for converting code data supplied from an external device, into an image signal and for supplying the image signal to said light-scanning optical system.

* * * * *

UNITED STATES PATENT AND TRADEMARK OFFICE
CERTIFICATE OF CORRECTION

PATENT NO. : 6,535,317 B2
DATED : March 18, 2003
INVENTOR(S) : Yoshihiro Ishibe

It is certified that error appears in the above-identified patent and that said Letters Patent is hereby corrected as shown below:

Column 1,
Line 25, "(polygon-mirror)," should read -- (polygon mirror), --.

Column 3,
Line 45, "said" should read -- the --.

Column 4,
Lines 2, 7, 12 and 16, "said" should read -- the --.
Line 48, "Is" should read -- is --.

Column 6,
Line 29, "means." should read -- means, --.
Line 51, "teristics." should read -- teristics, --.

Column 8,
Line 8, "is" should be deleted.
Line 12, "direction," should read -- direction. --.
Line 27, "βb=mb=/mb, βc=ma'/mc," should read -- βb=mb'/mb, βc=mc'/mc, --.
Line 50, "Systems" should read -- systems --.

Column 10,
Line 22, "Influence" should read -- influence --.
Line 63, "$1.5 \leq \beta c \geq 4.0$" should read -- $1.5 \leq \beta c \leq 4.0$ --.

Column 12,
Line 16, "$+B_5y^6$" should read -- $+B_8y^8$ --.
Line 30, "u." should read -- u, --.

Column 13,
Line 21, "8." should read -- 8, --.

Column 14,
Line 21, "a" should read -- 8 --.

Column 15,
Line 46, "Input" should read -- input --.

Column 18,
Line 51, "-2.513E-D9" should read -- 1.513E-09 --.
Line 64, "DB" should read -- D8 --.

UNITED STATES PATENT AND TRADEMARK OFFICE
CERTIFICATE OF CORRECTION

PATENT NO. : 6,535,317 B2
DATED : March 18, 2003
INVENTOR(S) : Yoshihiro Ishibe

It is certified that error appears in the above-identified patent and that said Letters Patent is hereby corrected as shown below:

Column 20,
Lines 62 and 67, "in" should read -- in a --.

Column 21,
Line 31, "frist" should read -- first --.
Line 50, "$|1m/\Phi 2m| \geq 100,$" should read -- $|\Phi 1m/\Phi 2m| \geq 100$, --.

Column 22,
Line 14, "$0.9 \leq \beta/\beta c \leq 1.1$" should read -- $0.9 \leq \beta/\beta c \leq 1.1$, -- and "(Eq. 3)," should be deleted.
Line 39, "image-for g" should read -- image-forming --.

Signed and Sealed this

Twenty-fifth Day of May, 2004

JON W. DUDAS
*Acting Director of the United States Patent and Trademark Office*